United States Patent
Cleland et al.

(10) Patent No.: US 7,070,226 B2
(45) Date of Patent: *Jul. 4, 2006

(54) POWERED OPENING MECHANISM AND CONTROL SYSTEM

(75) Inventors: Terry P. Cleland, Brampton (CA); Larry J. Ferriman, Campbellville (CA); Klaus Kurt Bytzek, Schomberg (CA); Gary J. Spicer, Mississauga (CA); Z. (Stan) Staniewicz, Scarborough (CA); Gerald Hamers, Woodbridge (CA)

(73) Assignee: Litens Automotive, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/686,816

(22) Filed: Oct. 17, 2003

(65) Prior Publication Data

US 2005/0168010 A1 Aug. 4, 2005

Related U.S. Application Data

(63) Continuation-in-part of application No. 10/131,599, filed on Apr. 25, 2002, now Pat. No. 6,719,356.

(60) Provisional application No. 60/419,286, filed on Oct. 17, 2002, provisional application No. 60/355,799, filed on Dec. 5, 2001, provisional application No. 60/304,743, filed on Jul. 13, 2001, provisional application No. 60/286,354, filed on Apr. 26, 2001.

(51) Int. Cl.
*B60J 5/10* (2006.01)

(52) U.S. Cl. ...................... 296/146.8; 49/339

(58) Field of Classification Search ............. 296/146.8; 49/339, 340, 341
See application file for complete search history.

(56) References Cited

U.S. PATENT DOCUMENTS

| | | |
|---|---|---|
| 3,059,962 A | 10/1962 | Harms et al. |
| 3,157,429 A | 11/1964 | Harms et al. |
| 3,713,472 A | 1/1973 | Dozois |

(Continued)

FOREIGN PATENT DOCUMENTS

DE 197 58 130 9/1998

(Continued)

OTHER PUBLICATIONS

Joe Gilbert, Technical Advances in Hall-Effect Sensing, Apr. 2001, Allegro Microsystems, (www.sensorland.com/Howpage014.html).

*Primary Examiner*—Patricia L. Engle
(74) *Attorney, Agent, or Firm*—Pillsbury Winthrop Shaw Pittman, LLP

(57) ABSTRACT

A power-operated system for actuating the liftgates of motor vehicles is disclosed. The system includes a controllable strut with internal locking structure that includes a driver and a valve assembly. The controllable strut is typically mounted on one side of the liftgate between the liftgate and the vehicle's frame. Conventional strut may be mounted on the other side of the liftgate. One end of each strut is connected to a powered articulating arm. To move the liftgate between open and closed positions, the articulating arms move the controllable strut and the other strut between positions of greater and lesser mechanical advantage. During the movements, the locking structure in the controllable strut may be activated and deactivated either cyclically or continuously to momentarily to retain the controllable strut as particular lengths.

19 Claims, 21 Drawing Sheets

U.S. PATENT DOCUMENTS

| | | | |
|---|---|---|---|
| 4,156,523 A * | 5/1979 | Bauer | 267/120 |
| 4,333,269 A | 6/1982 | Bascou | |
| 4,903,435 A | 2/1990 | Bittmann et al. | |
| 4,952,080 A | 8/1990 | Boiucaner et al. | |
| 5,067,687 A * | 11/1991 | Patel et al. | 251/129.08 |
| 5,147,106 A | 9/1992 | Bartelt et al. | |
| 5,448,856 A | 9/1995 | Moore et al. | |
| 5,450,933 A * | 9/1995 | Schuttler | 188/300 |
| 5,531,498 A | 7/1996 | Kowall | |
| 5,563,483 A | 10/1996 | Kowall et al. | |
| 5,588,258 A | 12/1996 | Wright et al. | |
| 5,851,049 A | 12/1998 | Squire et al. | |
| 5,851,050 A | 12/1998 | Squire et al. | |
| 5,921,604 A | 7/1999 | Yu et al. | |
| 5,982,126 A | 11/1999 | Hellinga et al. | |
| 6,055,775 A | 5/2000 | Dering et al. | |
| 6,055,776 A | 5/2000 | Dettling et al. | |
| 6,092,338 A | 7/2000 | Crowner et al. | |
| 6,182,952 B1 | 2/2001 | Gutierrez | |
| 6,202,350 B1 | 3/2001 | Montgomery et al. | |
| 6,270,149 B1 | 8/2001 | Fukumoto et al. | |
| 6,276,743 B1 | 8/2001 | Jyawook et al. | |
| 6,298,604 B1 | 10/2001 | Rogers et al. | |
| 6,755,458 B1 * | 6/2004 | Oberheide | 296/146.8 |
| 2002/0174604 A1 * | 11/2002 | Lauderbach et al. | 49/324 |
| 2004/0040213 A1 * | 3/2004 | McCarthy-Garland et al. | 49/341 |
| 2004/0124662 A1 * | 7/2004 | Cleland et al. | 296/146.4 |

FOREIGN PATENT DOCUMENTS

| | | |
|---|---|---|
| DE | 197 54 167 | 6/1999 |
| DE | 198 01 274 | 7/1999 |
| DE | 198 10 315 | 9/1999 |
| EP | 0 808 982 A2 | 11/1997 |
| EP | 0 267 876 A2 | 5/1998 |
| EP | 0 982 458 | 3/2000 |
| GB | 2 307 758 | 6/1997 |
| GB | 2 340 878 | 3/2000 |
| JP | 54-36223 | 3/1979 |
| JP | 63-142176 | 6/1988 |
| JP | 63-142178 | 6/1988 |
| JP | 64-29014 | 2/1989 |
| JP | 1-145224 | 6/1989 |
| JP | 5-141147 | 6/1993 |
| JP | 5-155253 | 6/1993 |
| JP | 5-280250 | 10/1993 |
| JP | 5-125866 | 8/1994 |
| JP | 10-227323 | 8/1998 |

* cited by examiner

POWERED OPENING MECHANISM AND CONTROL SYSTEM

CROSS-REFERENCE TO RELATED APPLICATIONS

This application is a continuation-in-part of U.S. patent application Ser. No. 10/131,599, filed on Apr. 25, 2002, now U.S. Pat. No. 6,719,356, which is incorporated by reference herein in its entirety. That application claims priority to U.S. Provisional Patent Application 60/286,354, filed Apr. 26, 2001, 60/304,743, filed Jul. 13, 2001, and 60/335,799, filed Dec. 5, 2001. The disclosure of U.S. Provisional Application 60/335,799 is incorporated by reference herein in its entirety. Priority is also claimed to U.S. Provisional Application No. 60/419,286, filed on Oct. 17, 2002, the entire contents of which are also incorporated herein by reference.

FIELD OF THE INVENTION

The present invention relates generally to powered systems for opening and closing closures such as doors and hatches, and more particularly, to powered systems for opening and closing motor vehicle closures.

BACKGROUND ART

Motor vehicle liftgates and deck lids act to close and seal the rear cargo area of a motor vehicle. Typically, these closures or closure structures are mounted in a frame located at the rear of the vehicle, usually on a horizontally extending axis provided by a hinge. The liftgate is thus positioned to rotate between a closed position adjacent to the frame and an open position, in which the cargo area of the motor vehicle is accessible. The liftgate or deck lid itself is often very heavy, and because of its mounting, it must be moved against gravity in order to reach the open position. Because of the liftgate's weight, it would be a great burden if a user was required to lift the liftgate into the open position and then manually hold it in place in order to access the vehicle's cargo area.

In order to make it easier to open liftgates and deck lids, most modern motor vehicles use gas or spring-loaded cylindrical struts to assist the user in opening and holding open liftgates and deck lids. The struts typically provide enough force to take over the opening of the liftgate after the liftgate has been manually opened to a partially opened position at which the spring force and moment arm provided by the struts are sufficient to overcome the weight of the liftgate, and to then hold the liftgate in an open position.

Usually, a motor vehicle liftgate-assist system consists of two struts. The two struts in a typical liftgate assembly are each pivotally mounted at opposite ends thereof, one end pivotally mounted on the liftgate and the other end pivotally mounted on the frame or body of the motor vehicle. Each strut's mounting point is fixed, and the strut thus possesses a fixed amount of mechanical advantage in facilitating the manual opening process. In addition, because the force provided by the struts is constant, the user must thrust downward on the liftgate and impart sufficient momentum to the liftgate to overcome the strut forces in order to close the liftgate.

Automated powered systems to open and close vehicle liftgates are known in the art. However, these systems typically use a power actuator to apply a force directly to the liftgate to enable opening and closing thereof. For example, U.S. Pat. No. 5,531,498 to Kowall discloses a typical liftgate-opening system in which the gas struts are actuated by a pair of cables which are, in turn, wound and unwound from a spool by an electric motor. Because this typical type of powered system acts as a direct replacement for the user-supplied force, it provides relatively little mechanical advantage from its mounted position, typically requires a significant amount of power to operate, and is usually large, acquiring a significant amount of space in the tailgate area of the vehicle, which is undesirable.

Control systems for the typical powered liftgate systems are also available. Such control systems usually include at least some form of obstacle detection, to enable the liftgate to stop opening or closing if an obstacle is encountered. These obstacle detection systems are usually based on feedback control of either the force applied by the liftgate or actuator motor or the speed at which the liftgate or motor is moving. One such control system for the type of cable-driven liftgate actuator described above is disclosed in U.K. Patent Application No. GB 2307758A. In general, the control system of this reference is designed to control the movement of the liftgate based on the measured liftgate force, using an adaptive algorithm to "learn" the liftgate system's force requirements. However, the movement of a liftgate is a complex, non-linear movement and existing control systems are usually adapted only for conventional "brute force" powered liftgate systems.

Other prior art power liftgate systems are more passive. For example, DE 198 10 315 A1 discloses an arrangement in which the angular position of a strut is changed in order to facilitate opening and closing of a deck lid. However, the structural configuration of the disclosed design is such that it permits a very limited range of closure movement and limited mechanical advantage in the different positions. In addition, among numerous other disadvantages, the device disclosed in DE 198 10 315 A1 does not provide a controlled system that enables dynamic control of the closure during movement thereof. This reference also does not contemplate use of the closure in manual mode, among other things.

DE 197 58 130 C2 proposes another system for automated closure of a deck lid. As with the '315 reference, the '130 reference does not contemplate or allow dynamic control over the deck lid, use of the deck lid in manual mode, and does not enable a power driven closing force to be applied to the lid. Moreover, both of the '130 and '315 references disclose very large structural arrangements, making packaging in a vehicle very difficult.

One particular challenge in power liftgate systems, especially those that are more passive, is dealing with situations in which the vehicle is parked or stopped on an incline. If the vehicle is parked or stopped on an incline, it may negate some or all of the mechanical advantage of the power liftgate system. Another challenge is designing a powered system such that the liftgate will open at a particular speed or within a particular time frame.

SUMMARY OF THE INVENTION

One aspect of the invention relates to a powered closure drive mechanism for a vehicle. The drive mechanism comprises a controllable strut, a motor assembly, a dynamic property detector, and a controller. The controllable strut is mountable between a frame of the vehicle and a closure pivotally connected to the frame. The strut has opposite ends moveable in opposite directions toward and away from one another. The strut also has a lock which, when in a locking condition, substantially prevents movement of the opposite ends of the strut relative to one another and, when the lock is in a releasing condition, allows movement of the opposite ends of the strut relative to one another. When the lock of the strut is in the releasing condition, the opposite ends of the strut are biased to move away from one another. The angular orientation of the strut is adjustable between orientations in which the bias of the strut overcomes a weight of the closure so as to move the closure in an opening direction, and orientations in which the weight of the closure overcomes the bias of the strut so as to move the closure in a closing direction. The motor assembly is operatively coupled with the strut so as to adjust the angular orientation of the strut by moving one of the opposite ends of the strut and, thereby, to effect opening and closing movement of the closure. The dynamic property detector detects one or more dynamic properties of the closure. The controller is operatively coupled to the motor, the lock, and the dynamic property detector. The controller controls the motor and the lock based, at least in part, upon the one or more dynamic properties detected by the dynamic property detector.

Another aspect of the invention relates to a method of actuating a pivotally-mounted closure supported by a controllable strut having an integral lock. The method comprises moving the controllable strut among angular orientations of the strut relative to the closure and the closure frame to move the strut between opening angular orientations in which the force bias provided by the controllable strut overcomes the weight bias the closure, causing the closure to move toward an open position, and closing angular orientations in which the force bias provided by the controllable strut is overcome by the weight bias of the closure, causing the closure to move toward a closed position. The method also comprises monitoring one or more dynamic properties of the closure while the closure moves toward the open and closed positions, and, based upon the monitored dynamic properties of the closure, selectively activating and deactivating the integral lock of the controllable strut to maintain the controllable strut at least temporarily at particular lengths.

Yet another aspect of the invention relates to a rear assembly for a vehicle. The rear assembly comprises a rear assembly frame, a closure, a motor, a controllable strut, a connecting member, a dynamic property detector, and a controller. The rear assembly frame defines an opening. The closure is constructed and arranged to engage in close of the opening. The closure is mounted on a generally horizontally-extending hinge for pivotal movement between open and closed positions. The motor is mounted to the rear assembly frame. The controllable strut has opposite ends moveable in opposite directions toward and away from one another, and has a lock that includes a driver within the controllable strut, a valve structure within the controllable strut that is driven by the driver to move between one or more blocking positions in which a strut working fluid within the controllable strut is prevented from moving through a restricted orifice structure within the strut and one or more non-blocking positions in which the strut working fluid may flow through the restricted orifice structure. When the lock is in a locking condition, it substantially prevents movement of the opposite ends of the strut relative to one another and, when the locking structure is in a releasing condition, it allows movement of the opposite ends of the strut relative to one another. The opposite ends of the strut are biased when the lock is in the releasing condition to move away from one another. The connecting member is pivotally connected to the motor and a first end of the controllable strut, and is constructed and arranged to move the first end of the controllable strut between opening angular orientations in which the bias of the controllable strut overcomes a weight of the closure so as to move the closure in an opening direction, and closing orientations in which the weight of the closure overcomes the bias of the strut so as to move the closure in a closing direction. The dynamic property detector detects one or more dynamic properties of the closure. The controller is operatively connected to the motor, the lock, and the dynamic property detector. The controller controls the motor and the lock based, at least in part, upon the one or more dynamic properties detected by the dynamic property detector.

BRIEF DESCRIPTION OF THE DRAWINGS

The present invention will be described with reference to the following drawing Figures, in which like reference numerals represent like structures throughout the Figures, and in which.

DETAILED DESCRIPTION

The present invention will be described below particularly with respect to its application in the rear liftgates of automobiles, such as mini vans and sport-utility vehicles. However, those skilled in the art will realize that the present invention may be applied to other types of vehicle closures and also to closures that are not mounted on vehicles. For example, the present invention may find an application in deck lids for automobiles, panel covers for light trucks, train doors, bus doors, and household closures, like windows and doors.

Figure 1:
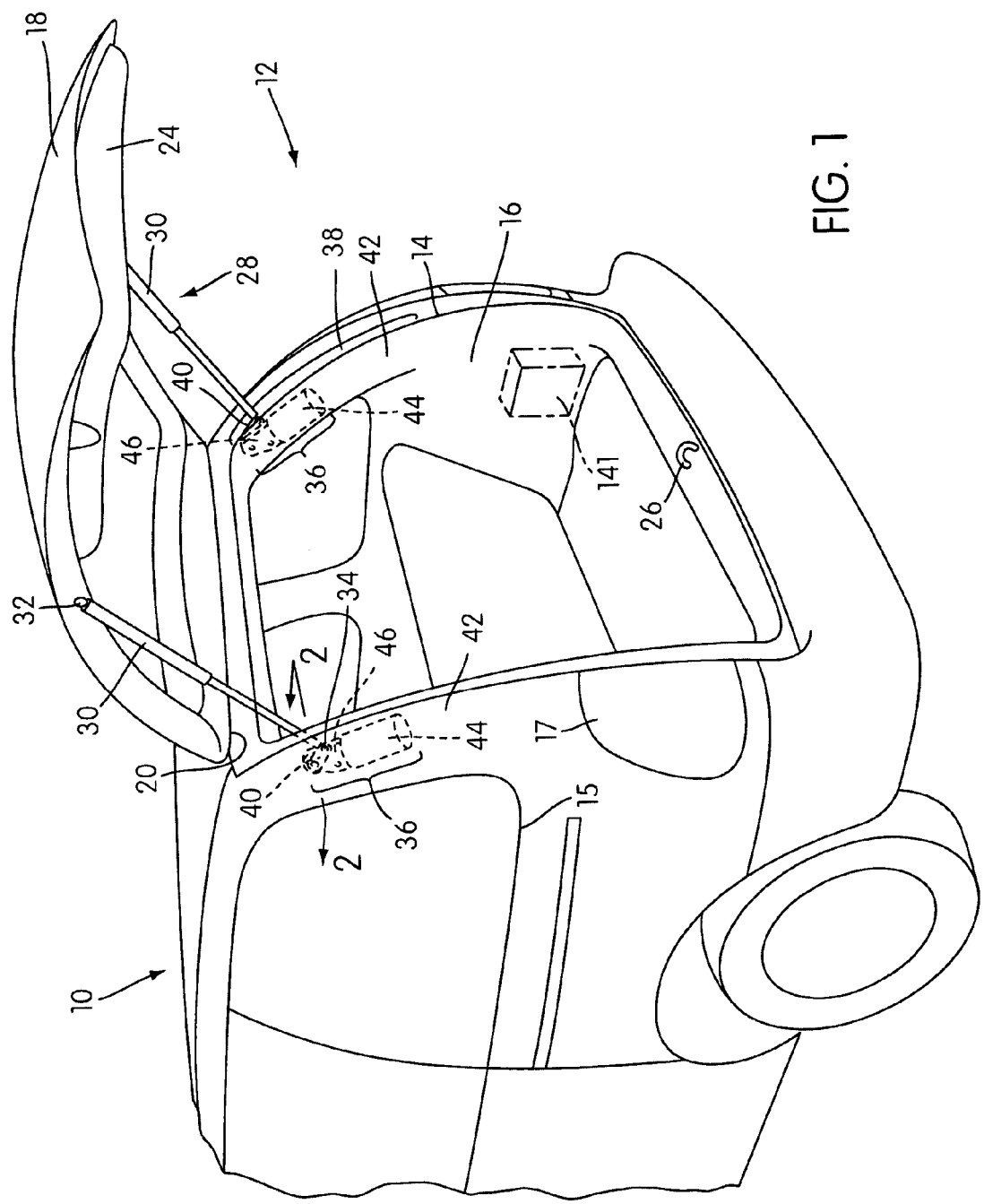
FIG. 1 is a perspective view of the rear assembly of an automobile according to the present invention.

FIG. 1 is a perspective view of an automobile, generally indicated at 10, with a rear assembly, indicated at 12, embodying the principles of the present invention. The rear assembly 12 comprises a vehicle body or frame 14 which defines an opening 16 at the rear of the automobile 10. A rear liftgate or door 18 (more generally referred to as a "closure") is constructed and arranged to fit in closed relation within the opening 16. The weight of the liftgate 18 biases it towards the closed position within the opening 16.

A hinge assembly 10 is connected between an upper portion of the frame 14 and an upper portion of the liftgate 18, mounting the liftgate 18 for movement in an upward direction opposed to the weight bias of the liftgate 18. The hinge assembly 20 provides a generally horizontally extending hinge axis of movement for all positions of the liftgate 18.

The rear assembly 12 also includes a strut assembly 28. The strut assembly of this embodiment includes two struts 30, one strut mounted on each side of the rear assembly 12 between the liftgate 18 and the frame 14. The strut assembly 28 may include only a single strut connected between the liftgate 18 and the frame 14. In other words, while two struts 30 are preferred, the function of the strut assembly 28 can be performed with a single strut 30.

Although gas struts 30 are preferred for most automotive embodiments of the present invention, it should be understood that any structural member capable of storing mechanical energy (i.e., a "resilient stored-energy member") may be used with the present invention. The particular choice of strut or other resilient stored-energy member depends on the weight of the liftgate 18, the desired movement rate of the liftgate 18 and strut assembly 28, and other conventional mechanical and structural considerations.

In particular, the struts 30 of this embodiment are mounted towards the top of the frame, proximate to the hinge 20. This type of configuration may be referred to as an "upper mount configuration." However, depending on the configuration of the rear assembly twelve, the struts 30 may be mounted on a lower portion of the frame 14, for example, below the window line 15 and above the tail light 17.

The mounting of the struts 30 in rear assembly 12 according to the present invention is significantly different than in prior art rear assemblies for automobiles. In the rear assembly 12, one end of the strut 30 is pivotally mounted to a fixed pivot 32 on the liftgate 18; the other end of the strut 30 is pivotally mounted on a moveable pivot 34 defined at the end of an articulating arm 40. The articulating arm 40 is itself pivotally mounted to a power-operated system 36 mounted within a rearwardly-facing longitudinal channel 38 in the rearward-most pillar 42 of the automobile 10. As will be described below in greater detail, movement of the articulating arm 40 caused by the power-operated system 36 changes the angular orientation of the struts 30, causing them to move between angular orientations in which the force bias provided by the struts 30 is sufficient to overcome the weight bias of the liftgate 18 and thereby move the liftgate 18 in to an open position, and orientations in which the force bias provided by the struts 30 is insufficient to overcome the weight bias of the liftgate 18, causing the liftgate 18 to move toward the closed position. When the liftgate 18 is caused to move toward the closed position, additional movements of the struts 30 may be used to control the movement of the liftgate 18, as will be explained below in greater detail.

Depending on the particular configuration of the rear assembly 12, either one or both struts 30 may be connected to a power-operated system 36. If both struts are not connected to a power-operated system 36, one strut 30 may be connected in a normal manner at two fixed pivot points between the frame 14 and the liftgate 18. If both struts 30 are connected to power-operated systems 36, they may be connected to separate, commonly controlled power-operated systems 36, which is the configuration shown in FIG. 1, or they may be connected to a single power-operated system that transmits power to both struts simultaneously. Commonly assigned co-pending application Ser. No. 10/131,599, filed on Apr. 25, 2002, which was incorporated by reference in its entirety above, discloses an embodiment in which two struts are connected to a single power-operated system that transmits power to both struts, and may be referred to for more details on that embodiment.

Figure 2:
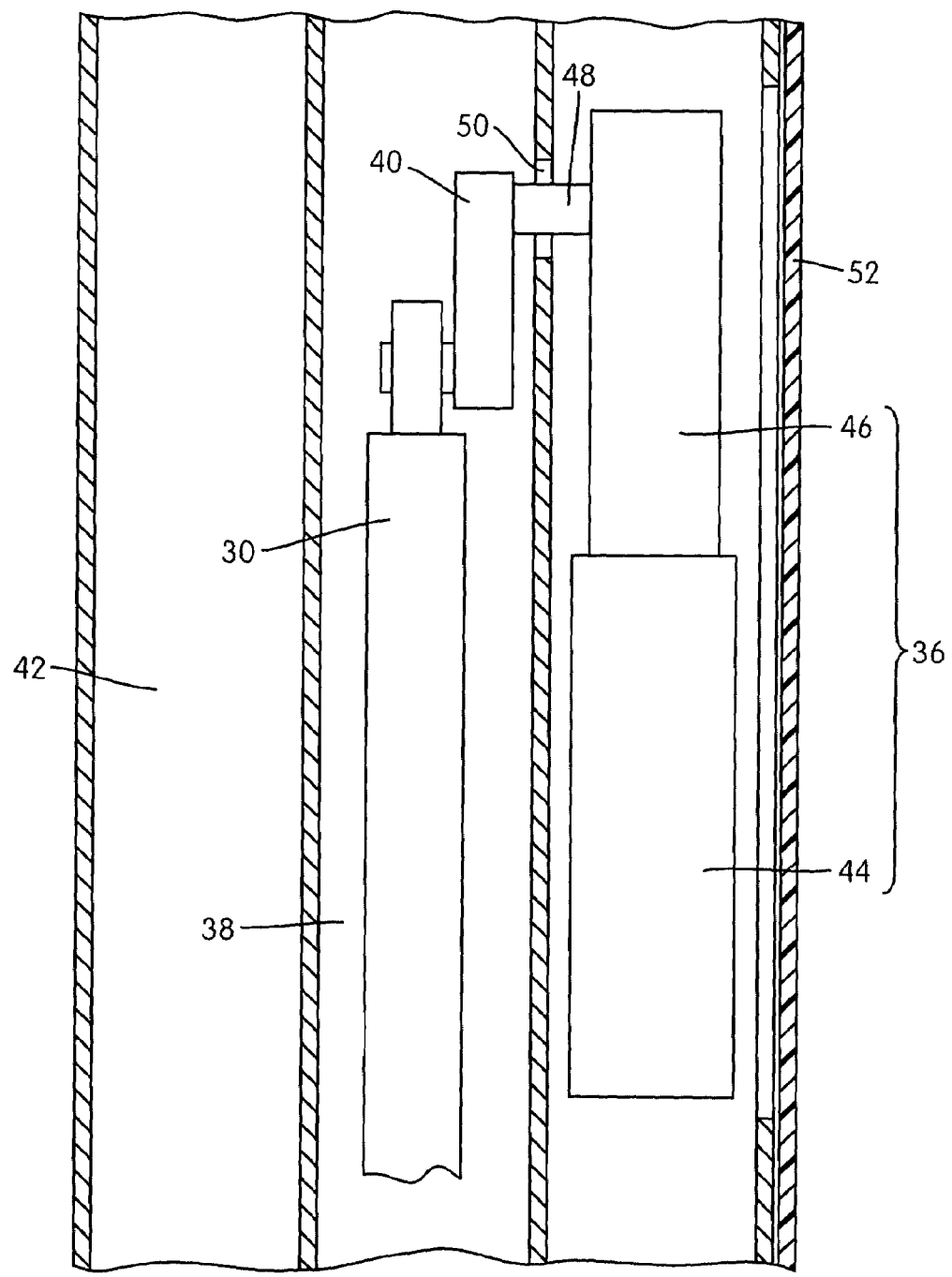
FIG. 2 is a sectional elevational view taken through line 2—2 of FIG. 1, showing the installation of a strut and power operated system in accordance with the invention in the rear assembly of FIG. 1.
Figure 3:
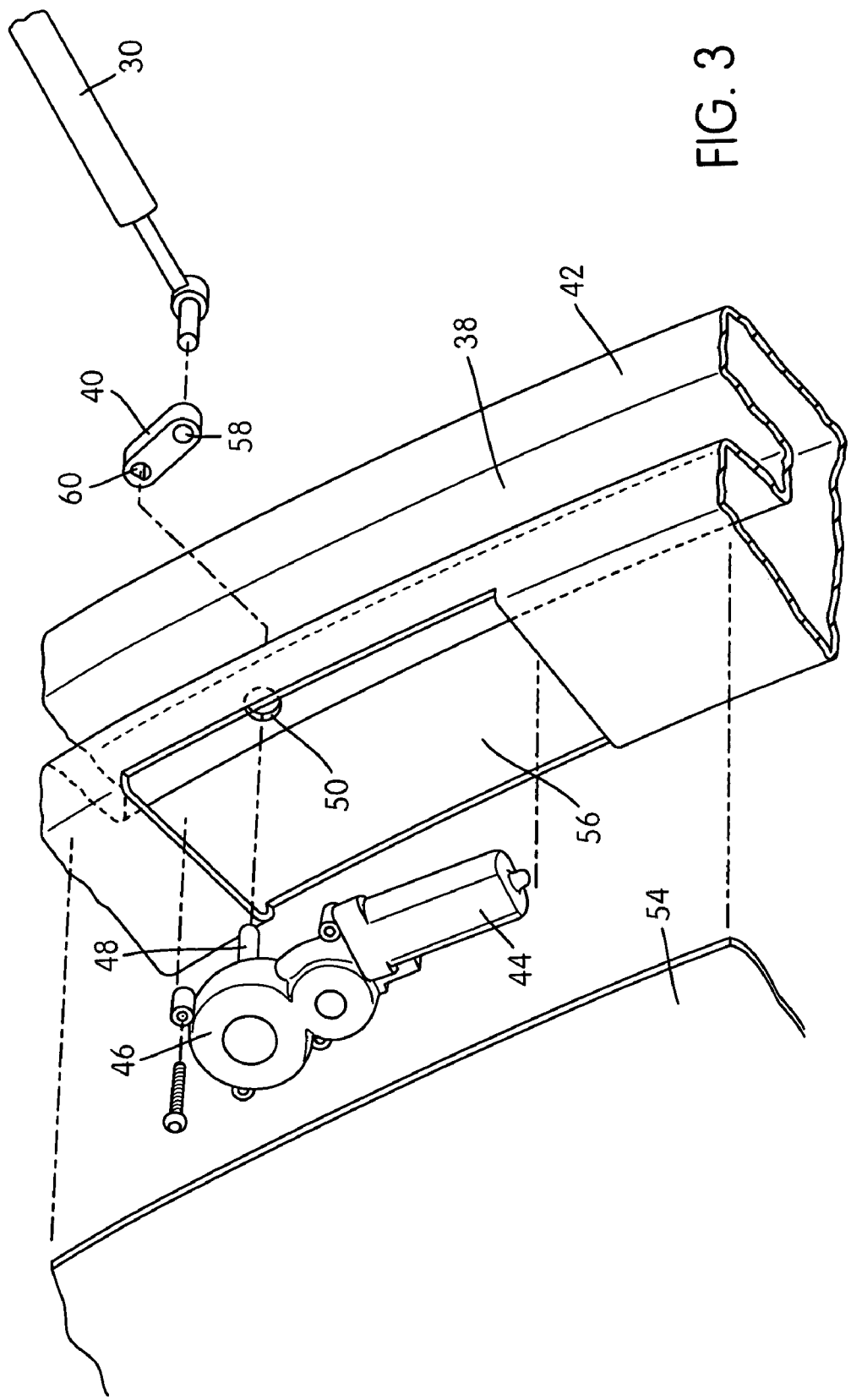
FIG. 3 is an exploded perspective view of a portion of the rearward most pillar of the automobile of FIG. 1.

FIGS. 2 and 3 show the mounting of the struts 30 and the power-operated system 36 within the rear assembly 12 in more detail. As was noted above, the power-operated system 36, which primarily comprises a motor 44 and gearbox 46, is mounted within the rearward-most pillar 42 of the automobile 10. In some cases the rearward-most pillar 42 may be the "D" pillar, depending on the particular automobile 10. An advantage of this type of mounting that the same automobile 10 can be used for both manual and automatic rear liftgate platforms. More particularly, because the same structure can be used whether the strut 30 is mounted to a rotating articulating arm 40 or a fixed point relative to the rearward-most pillar 42, the frame structure 14 and interior panels can be the same for both manual liftgate and automatic liftgate versions of the vehicle for the automobile 10, thus reducing the tooling costs of the automobile frame and panels.

FIG. 2 is a sectional view of the rearward-most pillar 42, taken through Line 2—2 of FIG. 1, illustrating the arrangement of the power-operated system 36 within the rearward-most pillar 42. As shown, the rearward-most pillar 42 is generally "C-shaped" such that it is provided with a rearwardly facing longitudinal channel that receives at least a portion of the strut 30 and at least a portion of the articulating arm 40 when the liftgate 18 is in the fully closed position. The motor 44, through the gearbox 46, drives a rotatable shaft 48 that extends through a portion of the pillar, shown as a hole 50 in FIG. 2, so as to extend in to the channel 38 and be connected with the articulating arm 40. Positioning of the struts 30 at least partially within the channel 38 formed in the rearward-most pillar 160 when the liftgate 18 is closed is advantageous in packaging and positioning the struts 30. A molded panel 52 covers the rearward-most pillar 42 toward the interior of the automobile 10.

FIG. 3 is an exploded view of a portion of the rearward-most pillar 42 illustrating the installation of the power-operated system 36 within the pillar 42. A lateral face 54 of the pillar 42 is removed to allow for the installation of the power-operated system 36, providing an access way 56 to the interior of the pillar 42. The power-operated system 36 is installed within the pillar 42 such that the shaft 48 of the gearbox 46 extends through hole 50. Within the rearwardly-facing longitudinal channel 38, the articulating arm 40 provides connecting structure, which in this case is hole 58, for connection to the strut 30 and connecting structure, in this case hole 60 for connection to the shaft 48. The power-operated system 36 is electronically controlled in a manner that will be described in more detail below.

An exemplary movement sequence of the liftgate 18 under the control of the struts 30 and power-operated system 36 will be described with reference to FIGS. 4–11, which are schematic side elevational views of the automobile 10 showing one side of the rear assembly 12.

Figure 4:
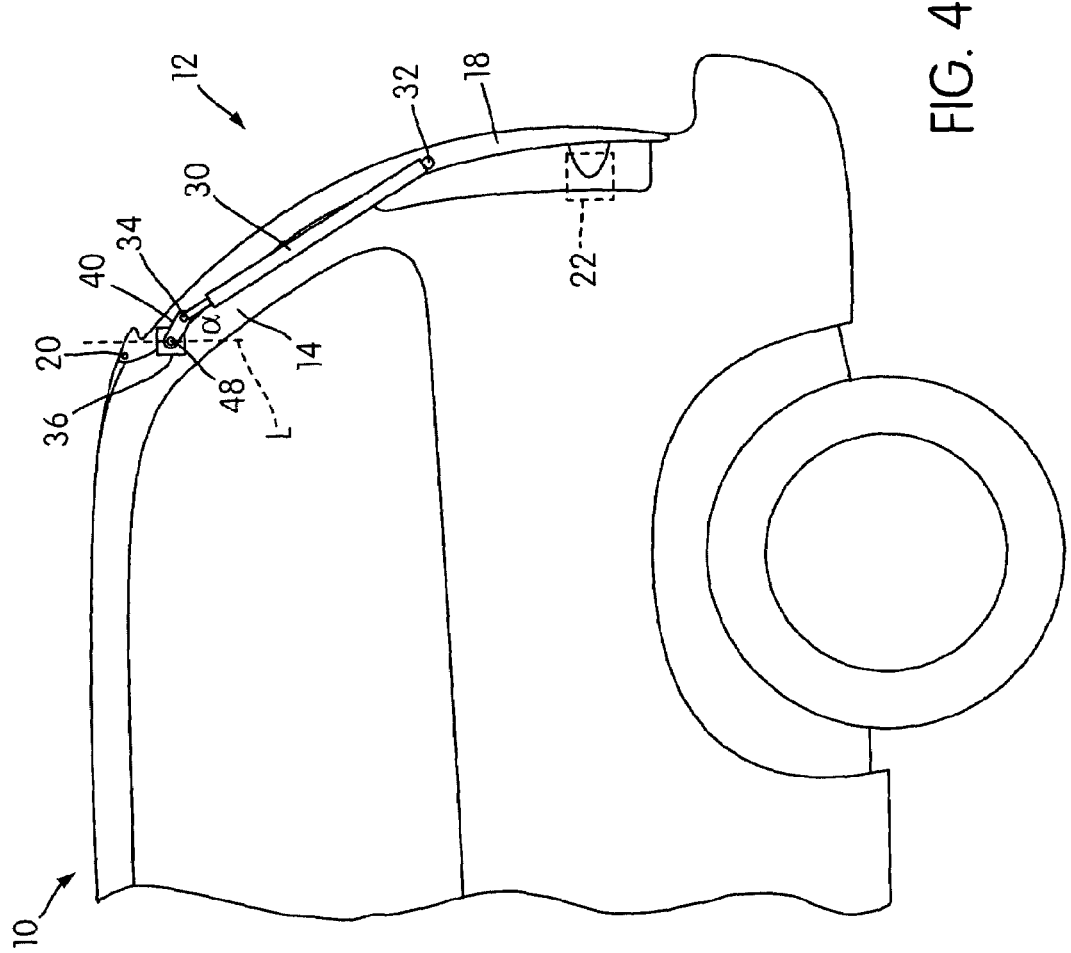
FIG. 4 is a schematic side elevational view of the automobile of FIG. 1, illustrating the liftgate in a closed position.

In FIG. 4, the liftgate 18 is in a closed position. The latch 24 in the lower portion of the liftgate is engaged with the latch striker 26 on the frame 14. (The latch 24 and latch striker 26 are indicated generally in FIG. 4 by reference numeral 22.) The strut 30 is in a compressed state. The articulating arm 40 is at an angle α of about 45 degrees to an imaginary vertical line L, shown in phantom in FIG. 4. In this position of the articulating arm 40, when the system is at rest, the strut 30 has minimal or substantially no mechanical advantage for opening liftgate 18. Therefore, the leveraged weight of the liftgate 18 is much greater than the effective force provided by the struts 30. The struts 30 are compressed by the weight of the liftgate 18 while the liftgate 18 remains in a closed position. Because the weight of the liftgate 18 is much greater than the effective force provided by the struts 30 in the position of FIG. 4, the liftgate 18 will remain in the closed position for as long as the position/orientation of the struts 30 is unchanged, even if the liftgate 18 is unlatched. That is, while the liftgate 18 may be latched into and unlatched from the closed position by the latch 24 and latch striker 26, the liftgate 18 remains in the closed position irrespective of whether or not it is latched because of the angular orientation of the struts 30. The angular orientation of the struts 30 is determined by the position of the articulating arms 40.

In the "at rest" or "home" position shown in FIG. 4, the adjustable pivot axis/point 34 for the strut 30 is located where a strut pivot axis/point would be located in a conventional manual strut-mounted rear liftgate, and provides mechanical advantage similar to that of a manual liftgate system. Therefore, while the articulating arm 40 is in the "home" position, the liftgate 18 may be opened entirely in manual mode, without use of the power operated system 36. The adjustable pivot axis/point 34 of the strut 30 will be disposed in this same "home" position when the liftgate 18 is fully opened (e.g. see FIG. 8), irrespective of whether the liftgate 18 has been moved to the fully open position manually, or by operation of the power-operated system. Thus, when the liftgate 18 is fully opened, the strut pivot axis/point 34 will be located where a strut pivot axis/point 34 would be located for a conventional manual strut-mounted rear liftgate. Therefore, the liftgate 18 may also be closed entirely in manual mode without use of the power-operated system 36.

To open the liftgate 18 using the power-operated system, the liftgate is unlatched (either automatically or manually) and the articulating arm or arms 40 are moved away from the "home" position illustrated in FIG. 4 to change the mechanical advantage of the struts 30. That is, to open the liftgate 18 after it is unlatched, the articulating arms 40 are moved into a position that geometrically favors a liftgate 18 lifting action for the strut 30, by the adjustable pivot axis/point 34 of each strut 30 being moved such that the struts 30 each have a greater mechanical advantage for liftgate-lifting action and exert a greater effective lifting force or moment arm on the liftgate 18. As the effective exerted force or moment arm of the struts 30 on the liftgate 18 increases, that exerted force/moment arm eventually becomes larger than the downward weight bias of the liftgate 18. Consequently, the struts 30 began to uncompress, providing the required energy for pushing the liftgate 18 toward the open position. For purposes of this description, the orientation or positioning of the struts 30 when the angular position of the articulating arms 40 (particularly pivot point 34 on which the strut is mounted) allows the struts 30 enough mechanical advantage to push the liftgate 18 open is referred to as the liftgate-raising relation of the strut or struts 30. In some cases, the articulating arm 40 may be moved before the liftgate 18 is unlatched.

Figure 5:
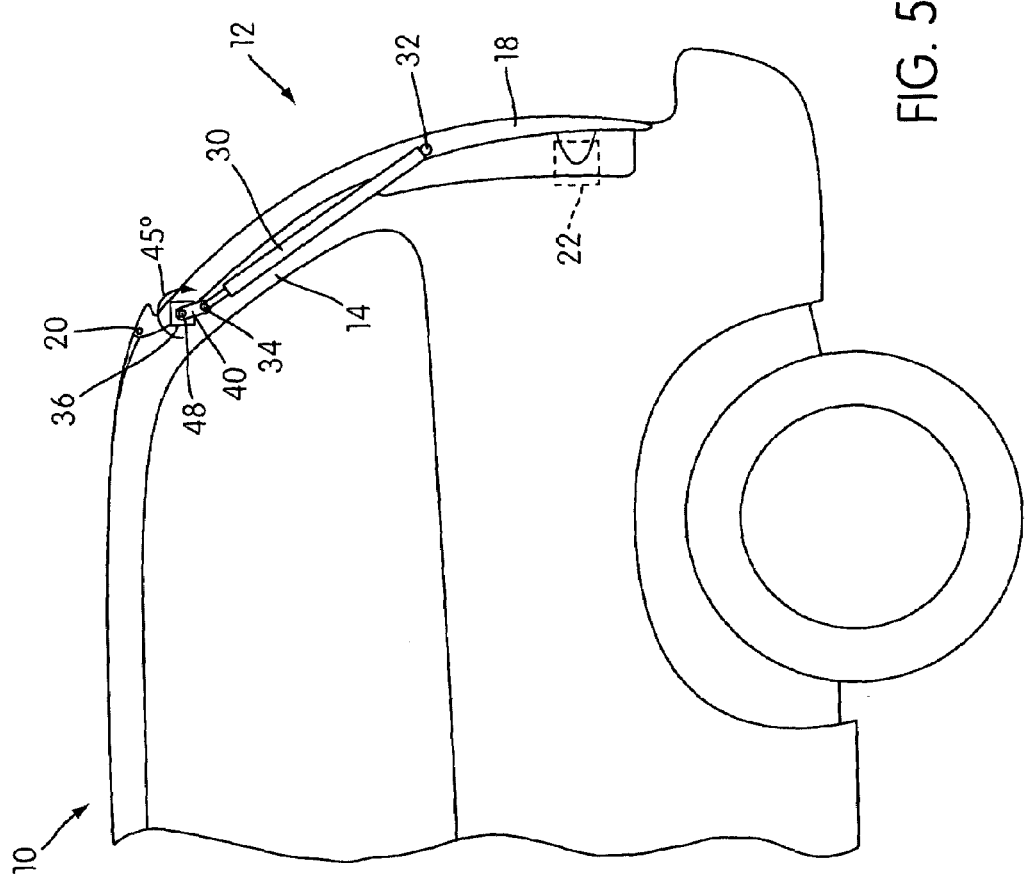
FIG. 5 is a schematic side elevational view similar to that of FIG. 4, illustrating initial movement of the door in order to open the liftgate.

FIG. 5 illustrates the movement of the articulating arm 40 and strut 30 into liftgate-raising relation. To establish the liftgate-raising relation, the articulating arm 40 is rotated in a clockwise direction with respect to the coordinate system of FIG. 5, away from the "home" position of FIG. 4. The precise amount of rotation that is required to place the strut 30 in liftgate-raising relation varies with the type of automobile 10 in which the system is installed, the precise position at which the struts 30 are mounted, and the inclination of the automobile 10, among other variables. In one example, the amount of rotation of the articulating arm is approximately 45° from the "home" position.

As the rotating arm 40 is rotated, the position of the adjustable pivot axis 34 relative to the pivot axis of hinge assembly 20 provides increasingly greater mechanical advantage or moment arm to the strut 30, and the struts 30 thus provide a force sufficient to overcome the weight bias of the liftgate 18. As the mechanical advantage of the strut 30 is increased, it begins to extend and to push the liftgate 18 open.

As was noted briefly above, movement or back and forth cycling of the articulating arms 40 may commence prior to unlatching the liftgate 18 in order to lubricate (or "unstick") the internal works, and also to provide a "boost" to the initial opening of the liftgate 18, particularly if the automobile 10 is tilted or inclined. These features will be described in more detail below. Depending on the system and particular operating conditions, the liftgate 18 may also be unlatched prior to any movement of arm 40.

The articulating arm 40 may initially remain in the position illustrated in FIG. 5 while the strut 30 extends and moves the liftgate 18 toward the open position, as illustrated in FIG. 4. Alternatively, the articulating arm 40 for one or both struts 30 may actively move and include instantaneous periods of stoppage or even instantaneous reverse movement during the initial opening process, depending on the particular geometries involved and feedback received by the control system. Feedback control of the power operated system 36 would be based on the door position and/or speed, as may be determined by a door position detector, such as an angular position encoder in the hinge assembly 20 or an inclinometer in the liftgate 18. A detailed description of position detection in general and several suitable types of position detectors can be found in commonly-assigned U.S. patent application Ser. No. 10/131,599 and will not be repeated here.

Figure 6:
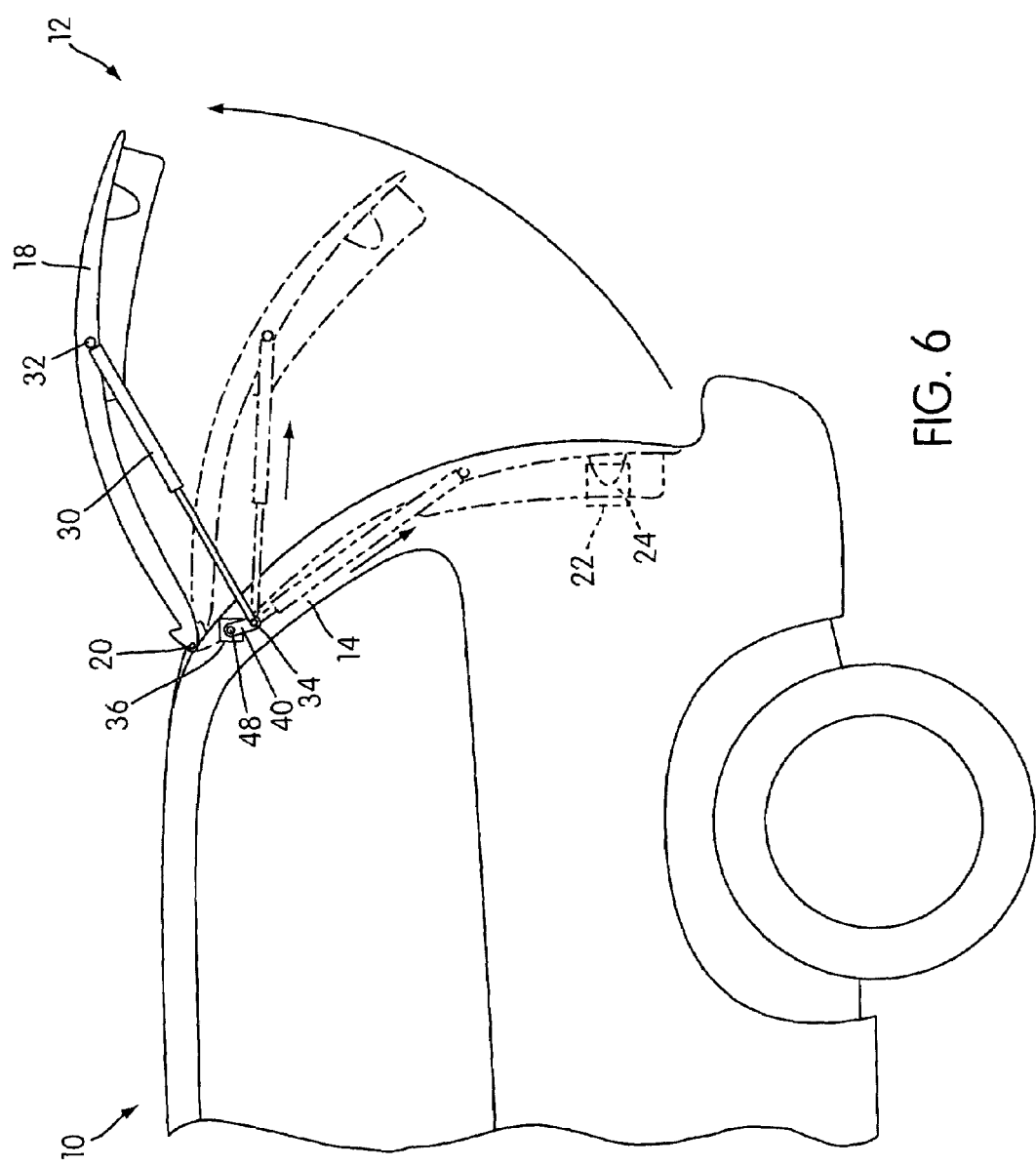
FIG. 6 is a sectional side elevational view similar to FIG. 5, showing the movement of the strut and the consequent opening of the liftgate.
Figure 7:
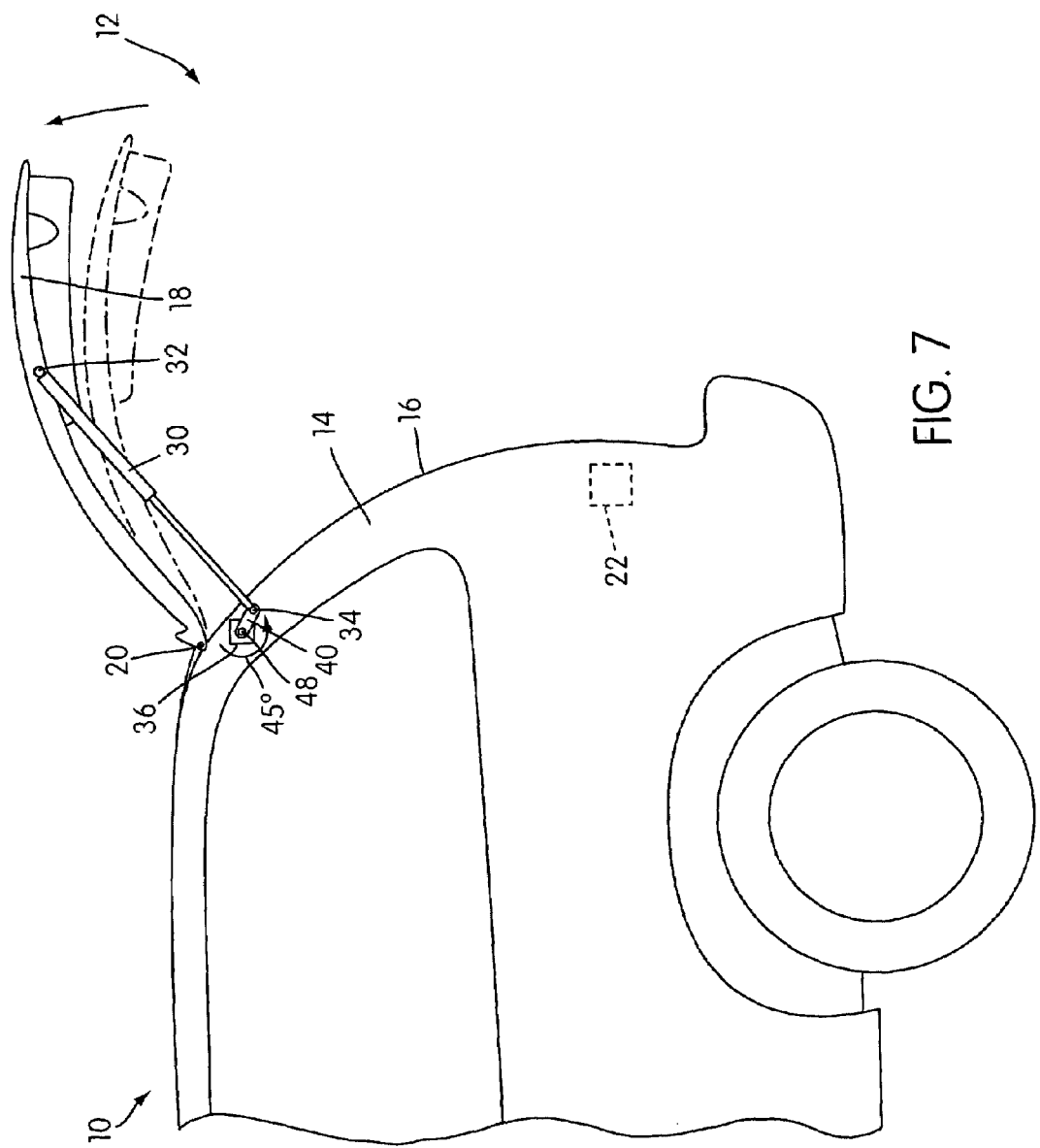
FIG. 7 is a schematic side elevational view similar to FIG. 6, showing the movement of the strut to move the liftgate into the full open position.
Figure 8:
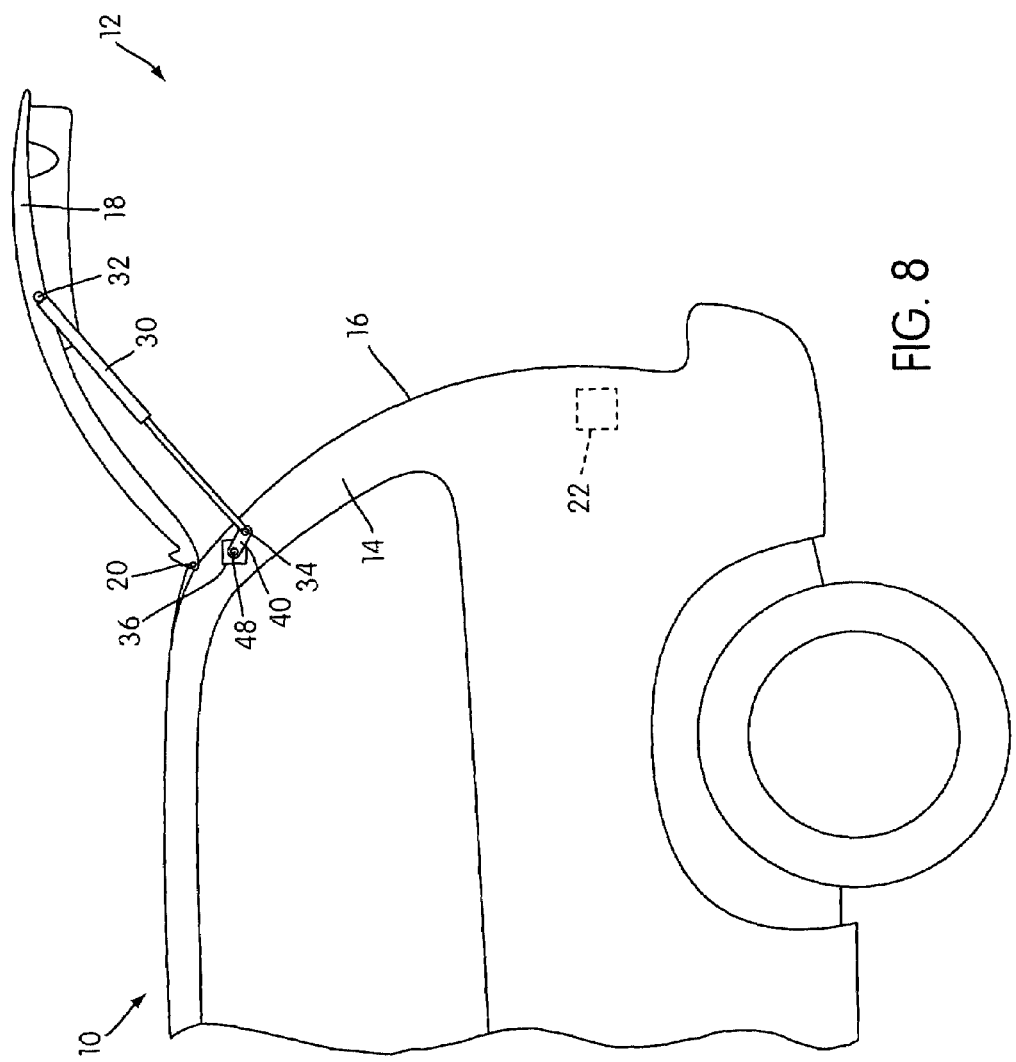
FIG. 8 is a schematic side elevational view of the automobile similar to FIG. 7, showing the liftgate in the full open position.

In the position illustrated in FIG. 6, the strut 30 has reached the limit of its extension. To move the liftgate 18 into a fully open position with respect to the frame 14, the articulating arm 40 is moved back toward the original "home" position shown in FIG. 4 by a rotation of the arm 40 in a counterclockwise direction with respect to the figure to push the liftgate 18 through the final portion of travel. This movement is illustrated in FIG. 7. The fully open position of the liftgate 18, with the strut 30 fully extended, is illustrated in FIG. 8.

Figure 9:
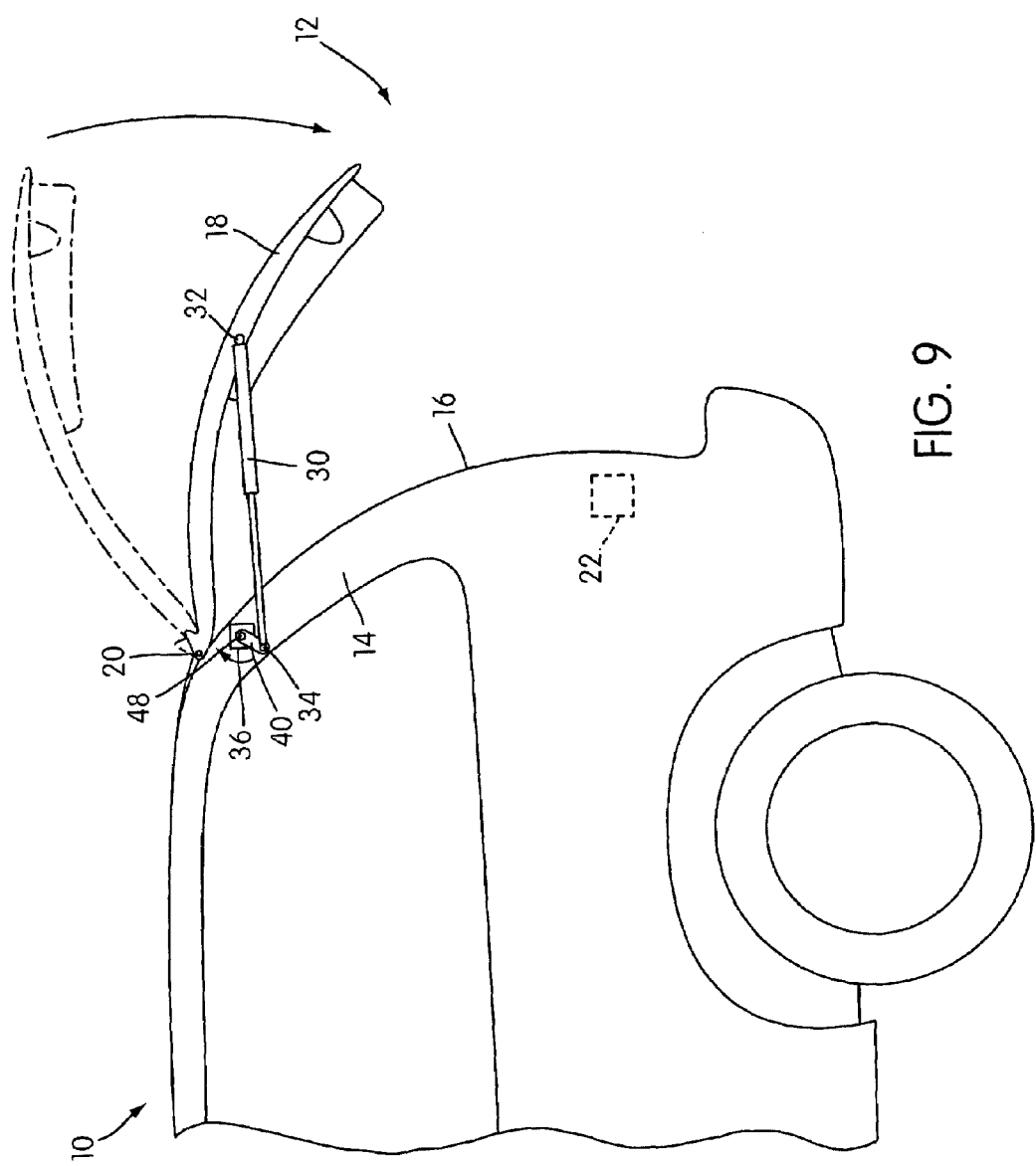
FIG. 9 is a schematic side elevational view of the automobile similar to FIG. 8, showing the change in angular orientation of the strut that begins the closing sequence of the liftgate.

In FIG. 9, the first steps of the liftgate-closing process are illustrated. The strut 30 is moved into an initial liftgate-closing relation by clockwise rotation (e.g., 45°) of the articulating arm 40 with respect to the figure. In the illustrated position, the position of pivot axis 34 relative to the hinge assembly 20 axis is such that the mechanical advantage or moment arm of the strut 30 is eroded, and the force provided by the strut 30 is overcome by the weight bias of the liftgate 18. The orientation or positioning of the struts 30 when the angular position of the rotating arm 40 reduces the mechanical advantage or moment arm of the struts 30 relative to the liftgate 18 so that the weight of the door moves the liftgate 18 toward the closed position is referred to as the liftgate-lowering relation of the strut or struts 30. To establish the liftgate-lowering relation, the rotating arm 40 is rotated so that it reaches a position that is, for example, 180-degrees displaced from the neutral or "home" position.

Figure 10:
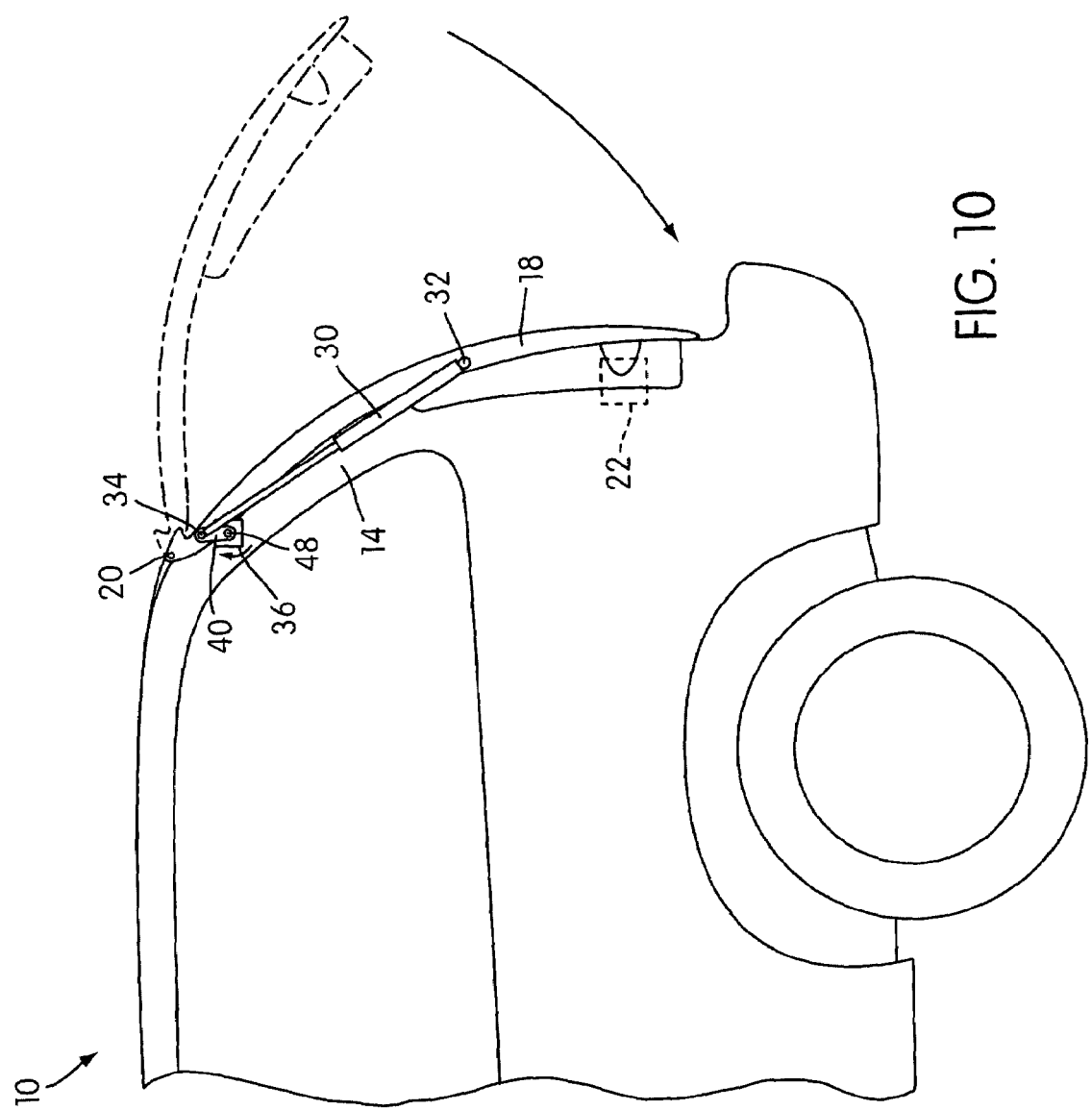
FIG. 10 is a schematic side elevational view of the automobile similar to FIG. 9, showing the closing sequence of the liftgate.

Once the rotating arm 40 has reached the position illustrated in FIG. 10 (axes 20, 34, and 32 being aligned), the strut 30 has substantially no mechanical advantage, and the liftgate 18 moves into a closed or near closed position, falling under its own weight. One of skill in the art will appreciate that when the weight of the liftgate 18 overcomes the force provided by the struts 30, the liftgate 18 may fall very quickly into the closed position if the closing action is uncontrolled. This type of quick movement is generally undesirable, as it provides little time to clear obstacles that may be present in the path of the liftgate 18. Likewise, if the ascent of the liftgate 18 is too quick, similar problems may arise. Small movements or oscillations of the arm 40 may be used to control movement of the liftgate 18 to prevent such rapid door movements.

Figure 11:
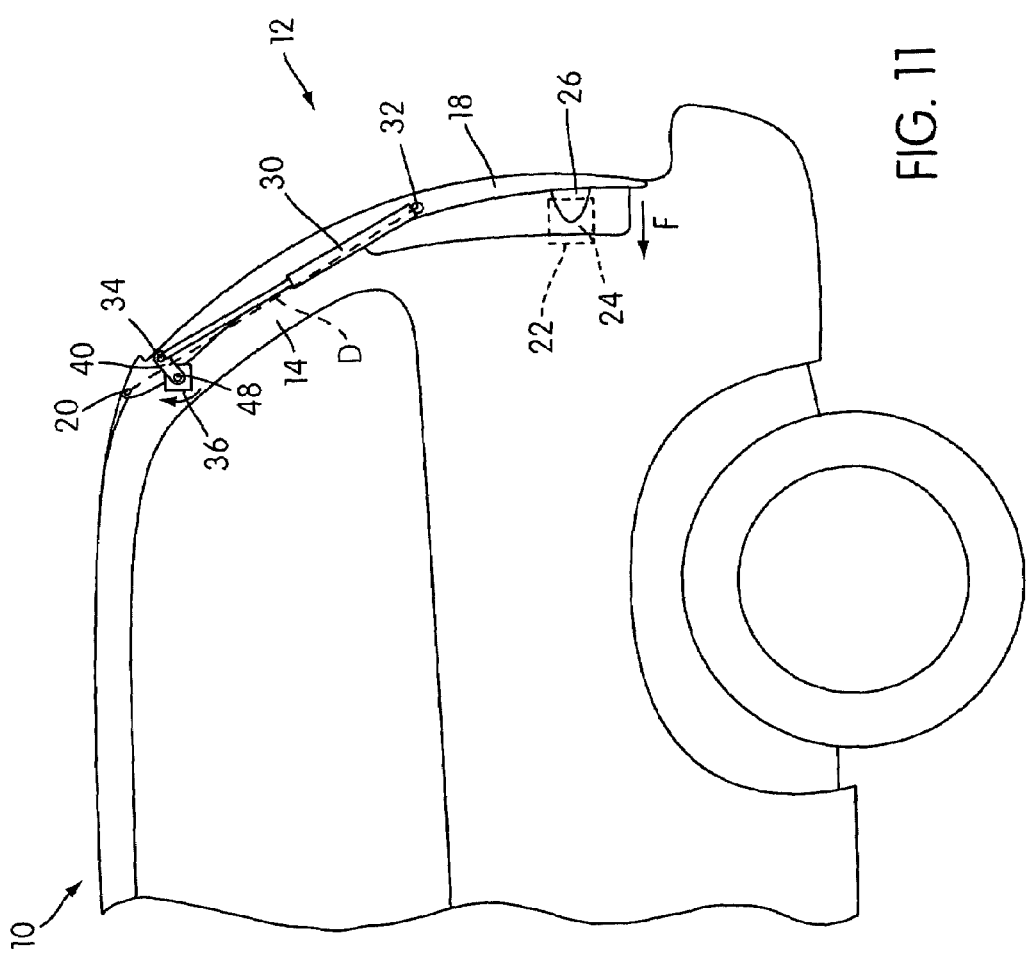
FIG. 11 is a schematic side elevational view of the automobile similar to FIG. 10, showing the final portion of the closing sequence of the liftgate.

The final steps of the closing sequence, which are illustrated in FIGS. 10 and 11, depend on what type of latch assembly 22 is installed in the rear assembly 12.

If a completely mechanical latch assembly 22 containing no powered actuator is installed, the articulating arm 40 would rotate clockwise, thus returning to the neutral or "home" position. The rotation of the articulating arm 40 clockwise back to the neutral position, together with the weight of the door, causes an inward force to be applied, forcing the liftgate 18 toward the frame 14 (as indicated by arrow F in FIG. 11). This inward force will be sufficient to cause an unpowered latch 24 and latch striker 26 to engage and releasably lock the liftgate 18 in a closed position. In general, when the strut pivot axis 34 of the strut 30 is positioned outwardly of a line of action between the hinge 20 and pivot point 32 (illustrated as phantom line D in FIG. 11), the line of action of the strut 33 causes a positive, liftgate closing force to be applied to the liftgate 18.

The latch assembly 22 that is installed in the rear assembly 12 may include a powered latch assembly or cinch latch, as discussed above. If such a powered mechanism is installed, it may only be necessary for the clockwise rotation of the articulating arm 40 and weight of the liftgate 18 to move the liftgate 18 close enough to the fully closed position to enable the powered latch 24 to take over the closing action and to cinch the liftgate 18 into sealed, locked relation.

It is anticipated that the geometry of the system, angular positions and the length of the articulating arm 40, will be varied depending on the particular automobile 10 in which the system is installed. The arm length variation may be accomplished by manufacturing articulating arms 40 of different lengths based upon the vehicle, or it may be accomplished by a mechanism to adjust the length of the rotating arm 40 based upon the automobile 10.

The geometries and strut 30 angular orientations described above may need to be modified according to the ambient temperature in which the automobile 10 is operating. In particular, if the strut 30 is a gas strut, the amount of force output by the gas strut is temperature dependent, as described by Charles's Law, which governs the relationship between the pressure of a compressed gas and the ambient temperature. Modifications to the movements illustrated in FIGS. 4–11 to account for temperature and/or automobile 10 inclination will be described in more detail below.

Control of the Strut Assembly

As was described briefly above, the rear assembly 12 is designed to operate under the control of an electronic control system or controller, shown schematically in FIG. 1 at reference numeral 141. In general, the electronic control system may have up to four functions: (1) moment-to-moment feedback control over the position of the door, (2) control of the rate of door ascent and descent, (3) obstruction detection, and (4) detection of potentially adverse environmental conditions. The control system 141 may be independent of the power operated system 36 or integrated with it. The functions of the control system may also include compensation for ambient temperature and other environmental considerations.

Figure 12:
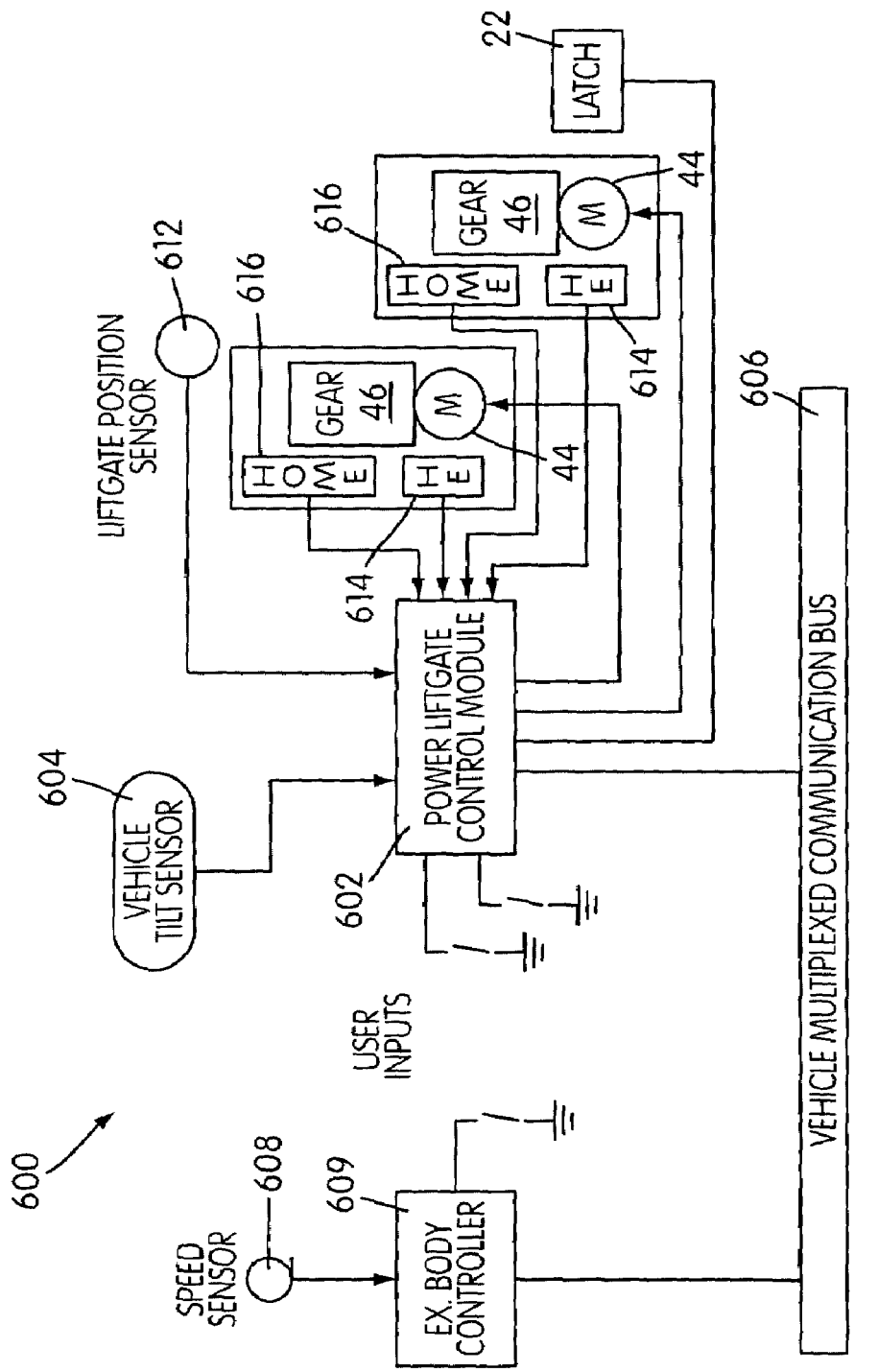
FIG. 12 is a high-level schematic diagram of a control system for a power-operated system in accordance with the invention.

FIG. 12 schematically illustrates the components of control system 600, which is suitable for use with the two-motor power operated system 36 illustrated in FIG. 1. As shown, the control system 600 includes a control module 602, which includes a microprocessor and other appropriate computing devices as described above. The control system 600 also includes a vehicle tilt sensor 604 and powered latch assembly 22 in communication with the control module 602. The control module 602 is connected to the main multiplexed communication bus 606 of the automobile 10. As shown, the vehicle speed sensor 608 (which connects to the external body controller 609) is also in communication with the control module 602 through the multiplexed communication bus 606.

The control system 600 also includes a liftgate position sensor 612 which monitors the position of the liftgate 18 as it moves. The liftgate position sensor 612 may be any one of the types of sensors described above. Depending on the design of the rear assembly 12 of the automobile 10, the liftgate position sensor 612 may or may not be directly coupled to the liftgate hinge 20, and may be an absolute or a relative position sensor. If a gravity-based inclinometer is used as the liftgate position sensor 612, vehicle tilt information can be obtained by reading the value of the liftgate position sensor 612 prior to actuation of the liftgate 18, which may make the vehicle tilt sensor 604 unnecessary. Also, a gravity-based inclinometer may be used as a position sensor, as described above.

The two motors 44 and gearboxes 46 of the powered system (one for the left-side strut 30 and one for the right-side strut 30) are schematically illustrated in FIG. 12. As shown, each of the gearboxes 46 includes a motor speed sensor 614 and a "home" position sensor 616. The motor speed sensor 614 of this embodiment is a Hall Effect sensor or another similar type of sensor. The "home" position sensor 616 of this embodiment a simple switch that activates when the rotating arm 40 returns to the "home" position, although the "home" position sensor 616 may be implemented as a Hall Effect or similar sensor in other embodiments. In general, the Hall Effect motor speed sensor 614 functions by counting pulses relative to the position of the articulating arm 40 in the "home" position. (The articulating arm 40 would be in the "home" position when the liftgate 18 is either fully opened or fully closed.)

Figures 17, 18:
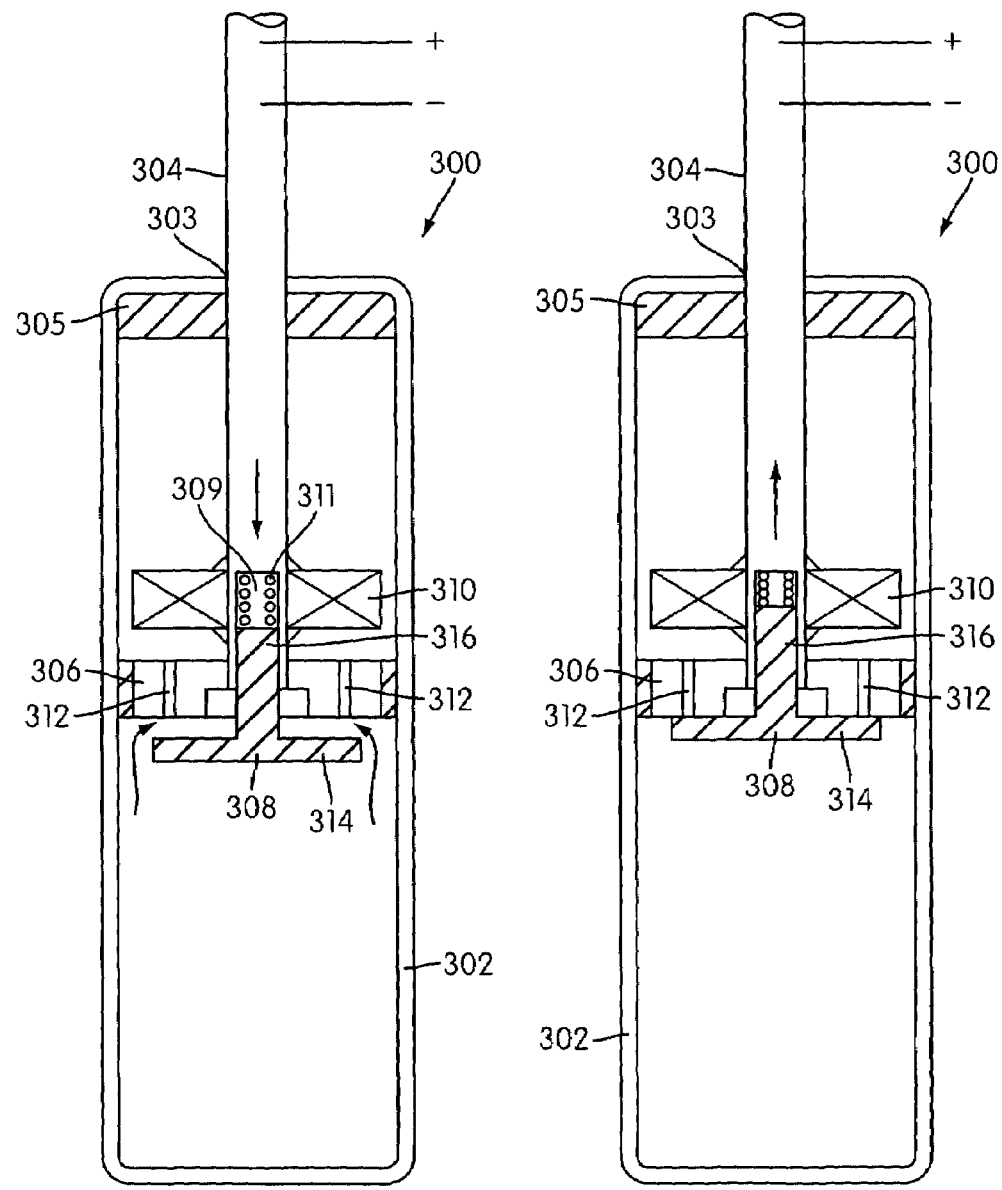
FIG. 17 is a schematic sectional view of one embodiment of a controllable strut in accordance with the present invention in an unlocked or free-flow condition.
FIG. 18 is a schematic sectional view of the strut of FIG. 17 in a locked or restricted flow condition.

The user inputs to control system 600 are not shown in FIG. 18. The control system 600 may take user input from a control panel mounted in the dashboard of the vehicle or from a transmitting key fob, both of which are well known in the art.

Figure 13:
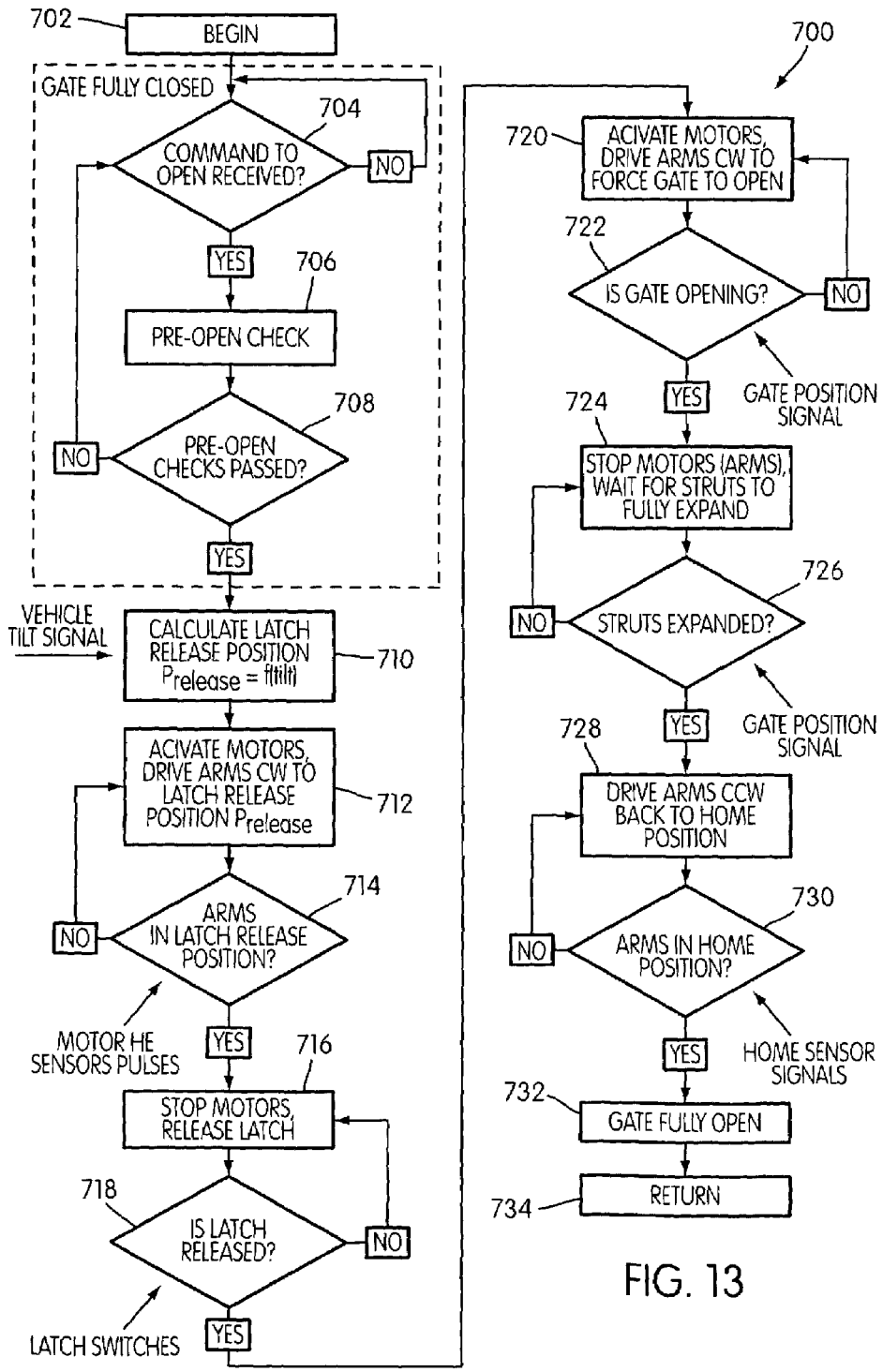
FIG. 13 is a high-level schematic flow diagram of a control algorithm for opening a liftgate using the control system of FIG. 12.

A control algorithm 700 for a door-opening sequence using control system 600 is shown in the block diagram of FIG. 13. In FIG. 13, the algorithm 700 begins at block 702 with the liftgate 18 in the closed position. The algorithm 700 proceeds to block 704. At block 704, the control system 600 determines whether the command to open the liftgate 18 has been issued. If the command to open the liftgate 18 has been issued (block 704: YES), control passes to block 706. If the command to open the liftgate 18 has not been issued (block 704: NO), control returns to block 704.

In block 706, pre-opening system checks are performed. These pre-opening system checks include checking whether the battery voltage is within a programmed range (e.g., 9–16 VDC), checking whether the vehicle tilt exceeds the design limitations, checking whether the automobile 10 transmission is set to "park," checking whether the automobile 10 is moving, and checking for any other safety hazards specific to the particular automobile 10. Additionally, if the articulating arms 40 are not in the "home" position, as indicated by "home" position sensor 616), the control module 602 may direct the motors 44 to move the articulating arms 40 into the "home" position so as to ensure a consistent starting position. Each of these pre-opening system checks may involve multiple measurements and decision blocks, although for simplicity, these additional measurement and decision blocks are not shown in FIG. 13. Once block 706 is complete, control passes to block 708, a decision block. In block 708, if any of the pre-opening checks have failed (block 706: NO), control returns to block 704 and the liftgate 18 remains closed. Otherwise (block 708: YES), control passes to block 710.

In block 710, the control module 602 calculates the position of the articulating arms 40 at which the latch assembly 22 will be released. This release position is a function of the vehicle tilt, and so input is taken from vehicle tilt sensor 604, or alternatively, if the liftgate 18 is equipped with an inclinometer liftgate position sensor 612, input may be taken from the liftgate position sensor 612 to determine the vehicle tilt. Once the latch release position has been calculated, control passes to block 712.

In block 712 the motors 44 are activated to move the articulating arms 40 to a position at which the struts 30 begin to exert outward and upward force on the liftgate 18. In this embodiment, the articulating arms 40 are driven clockwise during this task. As the articulating arms 40 reach the latch release position, control passes to block 714. At block 714, the control module tests whether the articulating arms 40 have reached the latch release position. If the articulating arms 40 have reached the latch release position calculated in block 710 (block 714: YES), control passes to block 716. Otherwise (block 714: NO), control returns to block 712 and the articulating arms 40 continue to move towards the latch release position.

In block 716, the latch 24 is released by a command from the control module 602 and the liftgate 18 begins to open. Control passes to block 718, in which the control module 602 tests whether the latch assembly 22 has been released. If the latch assembly 22 has been released (block 718: YES), control passes to block 720. Otherwise (block 718: NO), control returns to block 716 and the control module 602 once again attempts to release the latch assembly 22.

In block 720, the liftgate 18 opens as the motors 44 are activated to drive the articulating arms 40 as illustrated in FIG. 6, i.e., in a clockwise direction. Control passes to block 722. In block 722, the control module 602 confirms that the liftgate 18 is opening, and if so (block 722: YES), control passes to block 724. Otherwise (block 722: NO), control returns to block 720 and the articulating arms 40 continue to move.

At block 724, the articulating arms 40 have reached a designated position. The motors 44 are stopped to allow the struts 30 time to expand against the weight bias of the liftgate 18 to push the liftgate 18 toward the open position. Control passes to block 726. In block 726, the control module 602 checks whether the struts 30 have fully extended. If the struts 30 are fully extended (block 726: YES), control passes to block 728. Otherwise (block 726: NO) control returns to block 724.

In block 728, the control module 602 activates the motors 44 to drive the articulating arms 40 counter-clockwise, back to the "home" position. Once the articulating arms 40 are in the "home" position, the liftgate 18 can remain open under the bias provided by the struts 30 for an indefinite period of time. Control passes to block 730. In block 730, the control module 602 determines whether the articulating arms 40 have reached the "home" position. If the articulating arms 40 have reached the "home" position (block 730: YES), then the liftgate 18 is fully open, as indicated at block 732, and control passes to block 734, in which the algorithm terminates and returns. Otherwise (block 730: NO), control returns to block 728.

Figure 14:
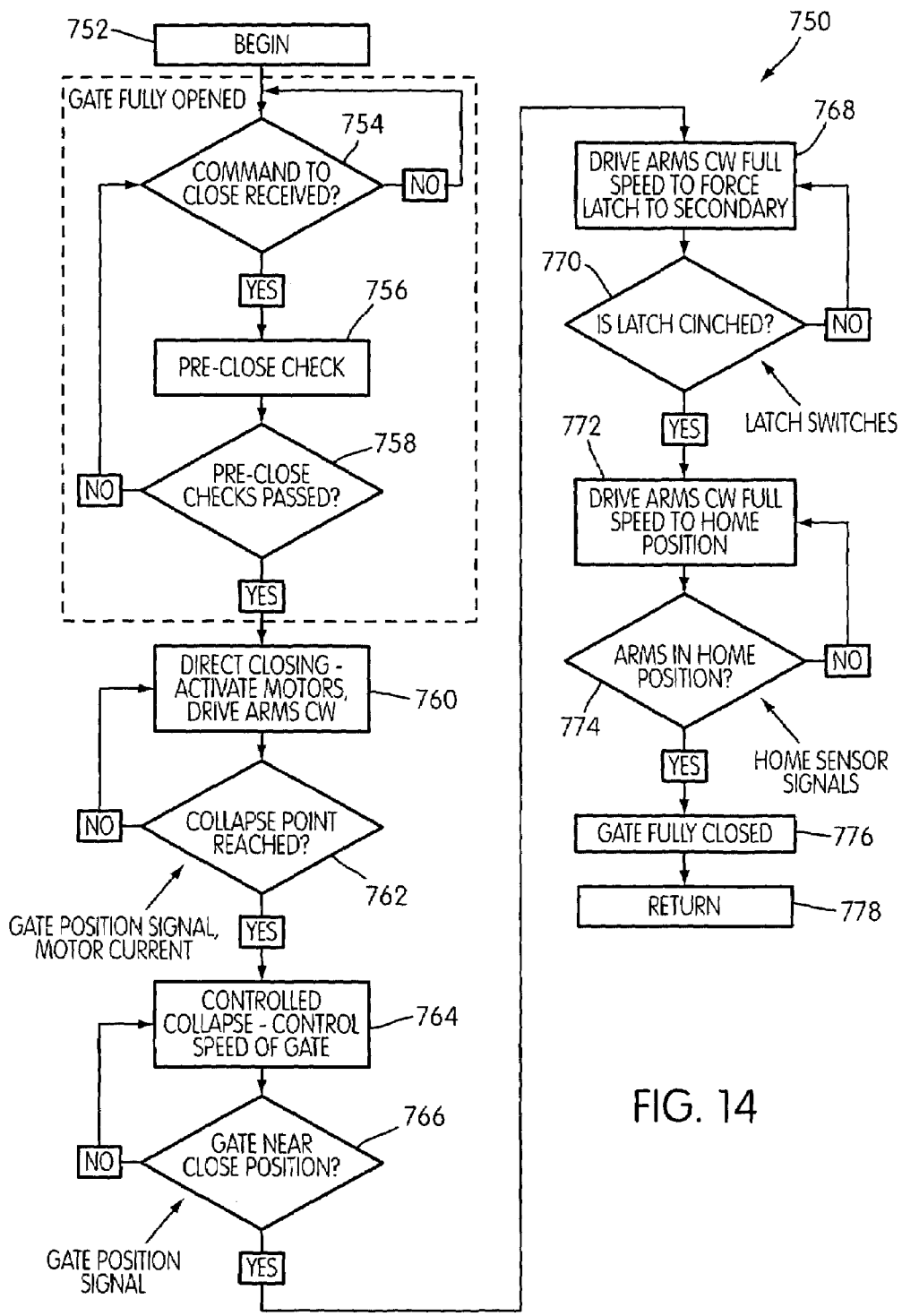
FIG. 14 is a high-level schematic flow diagram of a control algorithm for closing a liftgate using the control system of FIG. 12.

A control algorithm 750 for a door-closing sequence using control system 600 is shown in the block diagram of FIG. 14. The algorithm 750 begins at block 752 with the liftgate 18 open and control passes to block 754. In block 754, the control module 602 determines whether the command to open the liftgate 18 has been issued. If the command to open the liftgate 18 has been issued (block 754: YES), control passes to block 756. If the command to open the liftgate 18 has been issued (block 754: YES), control passes to block 756. Otherwise (block 754: NO), control returns to block 754.

In block 756, pre-opening system checks are performed. These pre-opening system checks may be the same as those in block 706 of FIG. 13 and include checking whether the battery voltage is within a programmed range (e.g., 9–16 VDC), checking whether the vehicle tilt exceeds the design limitations, checking whether the vehicle transmission is set to "park," checking whether the vehicle is moving, and checking for any other vehicle-specific safety hazards. Each of these pre-opening system checks may involve multiple measurements and decision blocks, although for simplicity, these additional measurement and decision blocks are not shown in FIG. 14. Once block 756 is complete, control passes to block 758, a decision block. In block 758, if any of the pre-start checks have failed (block 706: NO), control returns to block 754 and the liftgate 18 remains open. Otherwise (block 708: YES), control passes to block 760.

In block 760, the control module 602 activates the motors 44, causing the articulating arms 40 to move clockwise. Once the articulating arms 40 are moving, control passes to block 762. In block 762, the control module 602 determines whether the "collapse point" has been reached, i.e., whether or not the struts 30 have begun to collapse under the weight bias of the liftgate 18. If the "collapse point" has been reached (block 762: YES), control passes to block 764. Otherwise (block 762: NO), control returns to block 760 and the articulating arms 40 continue to move.

Blocks 760, 762 and 764 include several features that are not shown in FIG. 14, including obstacle detection. Block 760 is shown in more detail in FIG. 22, a detailed schematic diagram. As shown, block 760 begins with decision task 760A, in which the control module 602 determines whether it is the first second (or, more generally, the first instant) of a door closing. If the present instant is within the first second of closing (task 760A: YES), control passes to task 760B, where the control module 602 measures and stores in memory the current that the motor 135 is drawing. Control then passes from task 760B to task 760C. Otherwise (task 760A: NO), control passes directly to task 760C.

In task 760C of block 760, the control module 602 determines whether the present current that the motor 135 is drawing ($I_{mot}$ in FIG. 22) is greater than the reference current ($I_{ref}$ in FIG. 22) that was measured and stored in task 760B. If the motor current is greater than the reference current (task 760C: YES), control passes to task 760D, at which point an obstruction to door movement is assumed to exist and the direction of movement of the liftgate 18 is reversed. Otherwise (task 760C: NO), control passes to block 762 while the articulating arms 40 continue to move.

Block 760 provides a motor-based type of obstacle detection that is implemented as the motor begins to activate. The obstruction detection of block 760 may also be performed continuously or at designated points throughout algorithms 700 and 750. Additionally, the control module 602 may poll (i.e., interrogate) any pinch bars or other obstruction detection systems that are installed to determine whether an obstruction exists at any point in algorithms 700 and 750.

After the "collapse point" detected in block 762, the control system 600 controls the movement of the liftgate 18 somewhat differently. Prior to the "collapse point," the struts 30 act as rigid, incompressible members, and movement in the system is confined to the articulating arms 40. Once the "collapse point" has been reached, the struts 30 act as compressible members and collapse while the articulating arms 40 are moving. As another feature, the control module 602 may be programmed to know or anticipate when the "collapse point" will occur. This type of anticipation would be advantageous because the control module 602 would then be able to accommodate the change and keep the liftgate 18 from moving too quickly. There are three ways in which the control module 602 might anticipate the "collapse point." First, the current drawn by the motor 135 will spike when gravity begins to effect the struts 30, and the control module 602 may be programmed to recognize this current spike. Second, the control module 602 may be programmed to detect a sudden increase in liftgate door velocity from the liftgate position sensor 612 and to recognize this event as the "collapse point." Third, the control module 602 may be programmed to conclude, based on the position of the articulating arms 40, that the "collapse point" must have been reached for any reasonable inclination of the vehicle 10.

The "controlled collapse" of block 764 is a segment of the closing sequence of the door during which the movement rate of the liftgate 18 is maintained within a desired velocity profile. The "desired velocity profile" is, in one embodiment, a substantially constant speed, and the movement velocity of the liftgate 18 is maintained for most of its travel within a certain range (e.g., ±25%) of that desired constant speed. It should be appreciated that the velocity may jump out of the desired range at certain instances during the door movement, such as during initial opening, towards the end of opening, during initial closing, towards the end of closing, and at the transition when the strut begins to compress (e.g, the "collapse point") during closing, and that the system subsequently brings the velocity back into the desired velocity range or profile.

Figure 15:
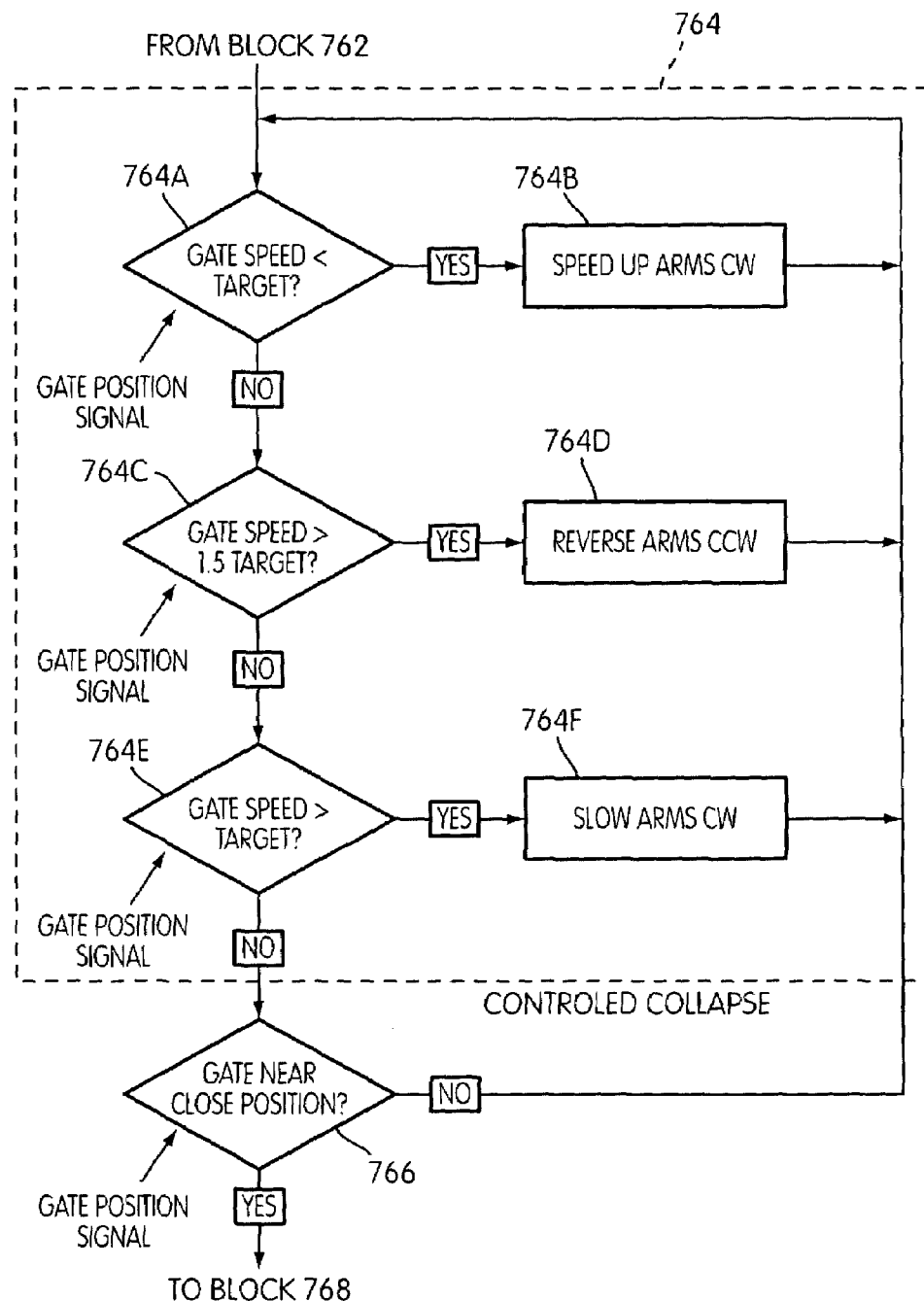
FIG. 15 is a high-level schematic flow diagram illustrating portions of the diagram of FIG. 13 in more detail.

Block 764 is shown in more detail in FIG. 15, a detailed schematic diagram. In task 764A, the control module 602 checks the speed of the liftgate 18 and compares it with a target speed stored in memory. If the liftgate door speed is less than the target speed (task 764A: YES), control passes to task 764B, in which the control module 602 instructs the motor 135 to speed up the movement of the articulating arms 40. Control then returns to task 764A. If the speed of the liftgate door is not less than the target speed (task 764A: NO), control passes to task 764C.

In task 764C, the control module 602 determines whether the liftgate is moving more than 1.5 times the desired target speed. If the liftgate door is moving more than 1.5 times the desired target speed (task 764C: YES), it is assumed that slowing the articulating arms 40 is an insufficient speed correction. Control passes to task 764D in which the direction of movement of the articulating arms 40 is reversed. Otherwise (task 764C: NO), control passes to task 764E.

In task 764E, the control module 602 determines whether the liftgate door speed is greater than the target speed. If the liftgate door speed is greater than the target speed (task 764E: YES), control passes to task 764F, in which the control module 602 directs the motors 44 to slow the articulating arms 40. Control then returns to task 764A. If the liftgate door speed is not greater than the target speed (task 764E: NO), control passes directly to block 766.

Figure 16:
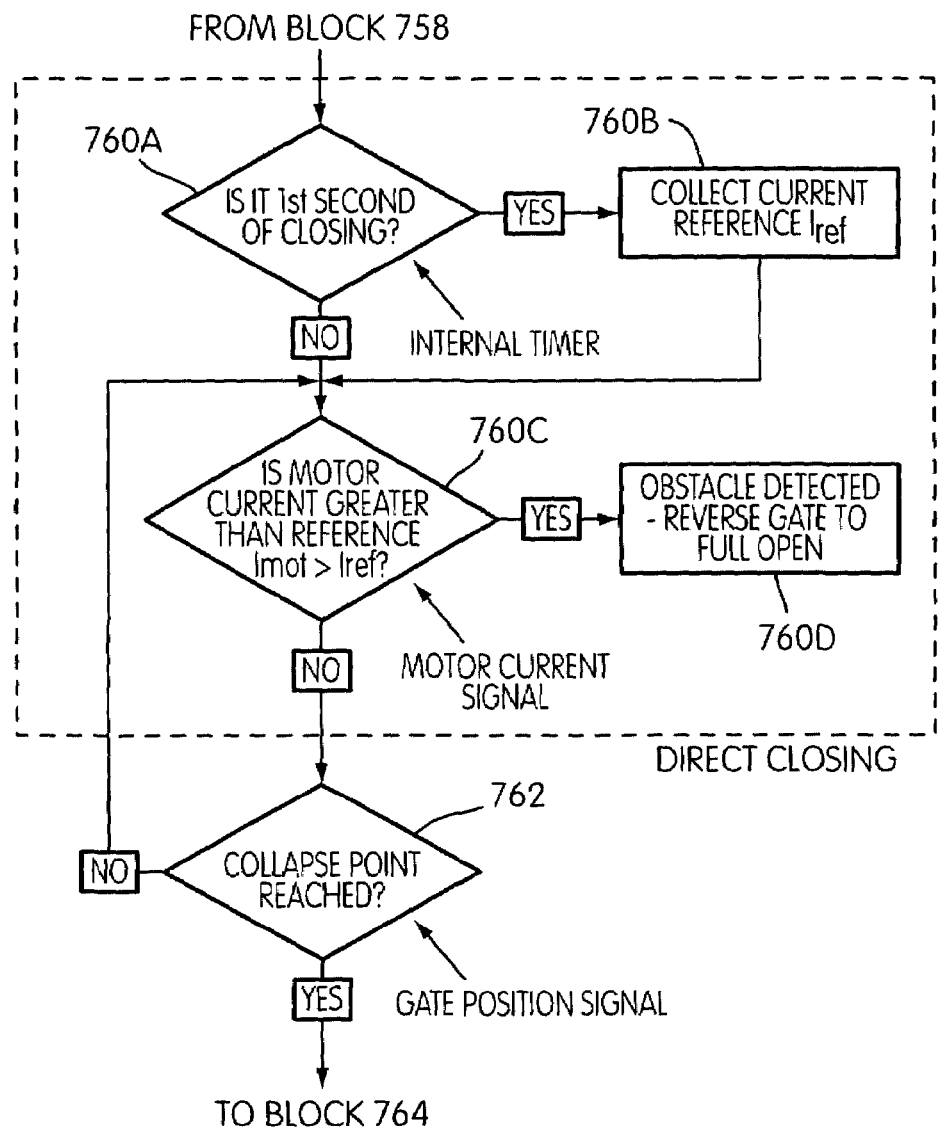
FIG. 16 is a high-level schematic flow diagram illustrating portions of the diagram of FIG. 14 in more detail.

In block 766, which is illustrated in FIGS. 15 and 16 for simplicity and clarity, the control module 602 determines whether the liftgate liftgate 18 is close to the closed position. This determination is made based on the output of the liftgate position sensor 612. If the liftgate door is close to the closed position (block 766: YES), control passes to block 768. Otherwise, control returns to task 764A and block 764 repeats.

In block 768, which is shown in FIG. 14, the control module 602 instructs the motors 44 to drive the articulating arms 40 in a counter-clockwise direction at full speed, and the angular orientation of the struts 30 at this point in the cycle imparts a force (shown as arrow F in FIG. 11) to force the liftgate 18 inward, causing the latch 24 to engage the latch striker 26. Control passes to block 770. In block 770, the control module 602 determines whether the latch assembly 22 has cinched. If the latch assembly 22 has cinched (block 770: YES), control passes to block 772. Otherwise (block 770: NO), control returns to block 768.

In block 772, the control module 602 instructs the motors 44 to drive the articulating arms 40 back to the "home" position. Control passes to block 774. In block 774, the control module 602 checks the "home" position sensors 616 to determine whether the articulating arms 40 have reached the "home" position. If the articulating arms 40 have reached the "home" position (block 774: YES), the liftgate 18 is assumed to be fully closed, as shown in block 776, and algorithm 750 terminates and returns at block 778. Otherwise (block 774: NO), control returns to block 772.

In the description of algorithms 700 and 750 above, the control module 602 is programmed to repeat the task of a particular block if a later decision block demonstrates that the task of that particular block has not been performed successfully. In cases where repetitive failure to perform a task could indicate a persistent error condition (for example, in block 708 of algorithm 700 and block 758 of algorithm 758), the control module 602 may be programmed to abort operations if a the tasks of a block are unsuccessful after a specified number of iterations.

As will be appreciated from the description above, the movement of the liftgate 18 between open and closed positions using the strut 30 and the power-operated system 36 represents a delicate balance between the lifting force provided by the strut 30 and the weight bias of the liftgate 18. If the liftgate 18 moves too quickly and is thus permitted to gain too much momentum, it becomes difficult to arrest its movement. Consequently, the movement of the liftgate 18 in the embodiments described above is typically relatively slow. Slow movements may be undesirable because of the time it takes the liftgate 18 to reach the open or closed positions.

Accordingly, it may be advantageous in some embodiments of the invention to use a controllable strut. As used here, the term "controllable strut" refers to any strut that can be stopped and held at a particular extended length to facilitate the opening and closing of the liftgate 18. When stopped a particular extended length, a controllable strut can be used as a substantially rigid member to push or pull the liftgate 18 open or closed, which would allow the opening and closing sequences to occur more quickly.

Several types of controllable struts have previously been used. One common type of controllable strut is that in which a valve is used to control the flow of fluid across the piston of the strut. When the valve is closed, fluid cannot flow across the piston, and the strut is thus stopped at a particular extended length. As those of skill in the art will realize, when a controllable strut of this type is stopped, is that the controllable strut is not entirely rigid Instead, the gas in each chamber of the strut retains its resilience, and the controllable strut essentially becomes a spring damper. In engineering terms, the effect of closing the valve of this sort of controllable strut is to increase the spring constant of the strut, for example, from about 1 newton per millimeter to about 50 newtons per millimeter. Although controllable struts with external valve structure are suitable for use in embodiments of the present invention, the external valve takes up additional space, and may create packaging problems, i.e., problems in fitting the struts and power-operated system 36 within the available space in the rear assembly 12 and the automobile 10. Additionally, in controllable struts with external valves, the external valve must work against both the pressure across the piston itself and the pressure created by the external hoses that run from the strut to the valve. Thus, external valves may need to be large in order to have the required strength to operate against those pressures.

However, in accordance with another embodiment of the invention, a controllable strut has been developed that include valve structure on its interior. One embodiment of the controllable strut, generally indicated at 300, is shown in the schematic sectional view of FIGS. 17 and 18. FIG. 17 is a view of the strut 300 in its unlocked or free-flow condition. As shown in FIG. 17, the strut 300 generally comprises a hollow housing 302 a piston 304, a baffle 306, a valve 308, and a driver 310.

The hollow housing 302 is hermetically sealed and has an opening 303 at one end. The piston 304 passes through the opening, and the sealed condition of the housing 302 is maintained by a sealing structure 305 proximate to the opening 303 that forms a seal between the piston 304 and the opening 303. As installed within the housing 302, the piston 304 is capable of reciprocating between an extended position and a retracted position. The piston 304 includes a baffle 306 mounted on the end of the piston rod within the housing 302. The baffle 306 sealingly and slidingly engages the interior walls of the housing 302. The baffle 306 has a number of orifices 312 that, in an open condition, allow fluid to pass from one side of the piston 304 to the other. The size and number of the orifices 312 determine the amount of damping that the strut 300 provides.

The valve 308 is shaped as a plunger having a steam portion 316 and a flange portion 314 that extends radially outward. The steam 316 of the valve 308 is slidingly mounted within a channel 309 in the piston 304, such that the valve 308 may reciprocate between open and closed positions. A coil spring 311 within the channel 309 biases the valve 308 toward the open position shown in FIG. 17. In the closed position in FIG. 18, the flange portion 314 of the valve 308 is in contact with the baffle 306, blocking the orifices 312 and preventing fluid from flowing across the baffle 306. Preferably, the working fluid within the strut 300 is a gas, such as air. However, other fluids may also be used in struts 300 according to the present invention.

The valve 308 is driven between the open and closed positions by the driver 310, which is operatively associated with the valve 308. The driver 310 is fixedly mounted to the piston 304 on the inside of the housing 302. As shown in FIGS. 17 and 18, the position of the driver 310 on the piston 304 corresponds to the location of the channel 309 in the piston 304.

In this embodiment, the driver 310 is an electromagnetic coil. Activation of the electromagnetic coil driver 310 pulls the valve against the baffle 306, such that the valve is in the closed position illustrated in FIG. 18. The electrical leads for the driver 310 are routed through the interior of the piston 304 and extend to the exterior of the housing 302 for electrical connection to the electrical system of the automobile 10 and the controller for the power-operated system 36. The controller provides electrical signals to energize the driver 310.

Because the driver 310 is located within the housing 302, the engagement force is required to drive the valve 308 into the closed position adjacent the baffle 306 are significantly lower than prior art designs. In the strut 300, the only forces that the valve 308 must resist are the forces caused by the pressure differential across the piston, which is typically not large.

Figure 19:
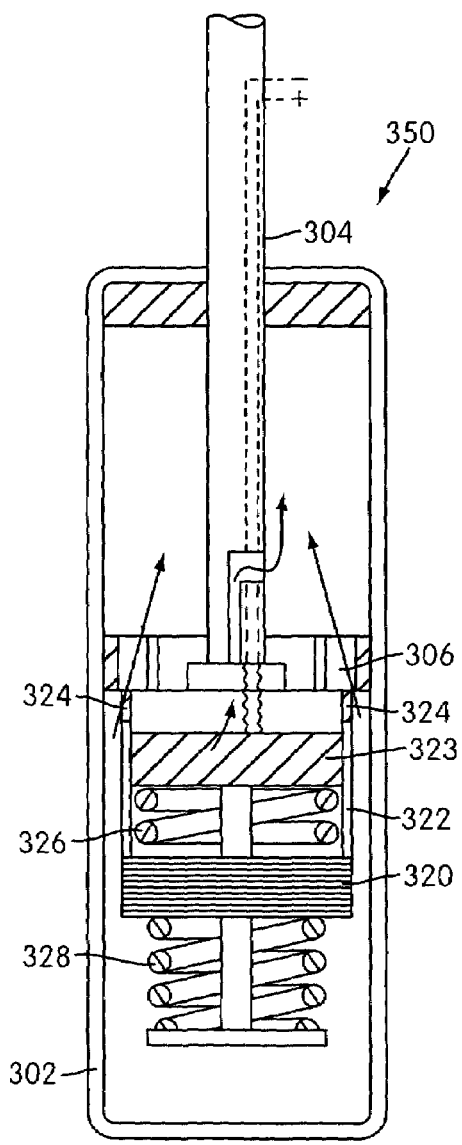
FIG. 19 is a sectional schematic view of a strut according to another embodiment of the invention in an unlocked or free flow condition.
Figure 20:
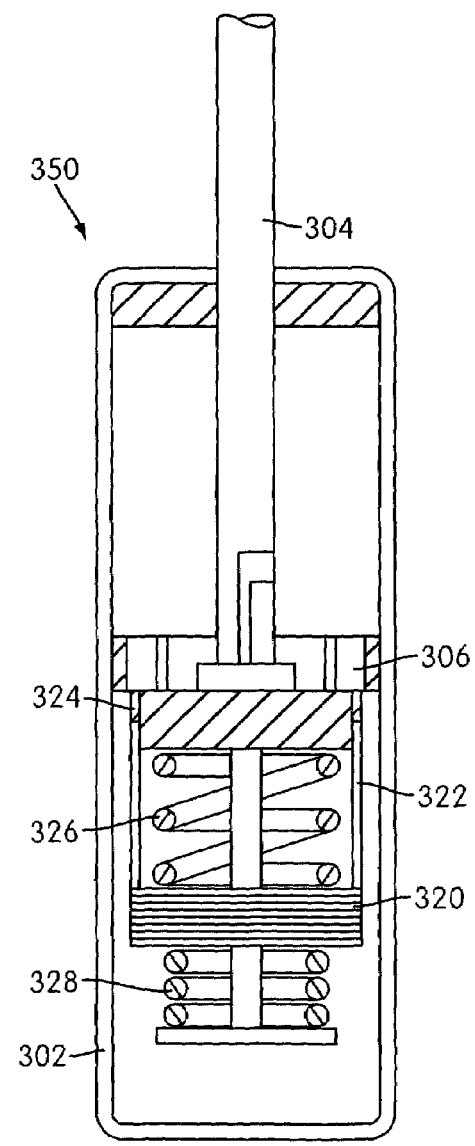
FIG. 20 is a sectional schematic view of the strut of FIG. 19 in the locked or restricted flow condition.

Another embodiment of a controllable strut 350 is shown in the schematic sectional views of FIGS. 19 and 20. FIG. 19 illustrates the strut 350 in the open or free flow condition; FIG. 20 illustrates the strut 350 in the locked or restricted flow condition. In the strut 350, a solenoid 320 is mounted on a hollow cylinder 322 within the housing 302. The hollow cylinder 322 has a number of passageways 324 circumferentially spaced about the mounting end thereof, which is proximate to the baffle 306. The cylinder 322 is mounted to the baffle 306. The valve of this embodiment, indicated at reference numeral 323, is a block of sealing material proximate to the baffle 306. Springs 326 and 328 extend between the valve 323 and solenoid 320 and are arranged to bias the valve 323 into the open position shown in FIG. 19. When the solenoid 320 is energized, the valve 323 moves to the position shown in FIG. 20, in which it blocks the orifices 312 in the baffle 306. As with the previous embodiment, the electrical connections for the solenoid 320 run through the interior of the piston 304 for external connection to the controller for the power-operated system 36.

In addition to the above, controllable struts 300, 350 have several other advantages. For example, if the driver 310 is an electromagnetic coil, in addition to its function as a driver 310 to control the strut, it may be used to detect the temperature inside the strut 300, 350, as well as to heat the interior of the strut 300, 350.

The resistance of an electromagnetic coil used as a driver 310 is typically specified very precisely by its manufacturer. Because the resistance of a coil is a function of the ambient temperature, the temperature inside the strut 300, 350 can be monitored by monitoring the resistance of the electromagnetic coil and comparing it to known values specified by the manufacturer. In order to heat the interior of the strut 300, 350, current can be supplied to the driver 310, turning it into a resistive heating element. This feature can be used to increase the temperature within the strut on very cold days, during which the gas pressure within the strut might otherwise not be sufficient to open the liftgate.

In addition to temperature measurement, technology for remotely measuring and sensing pressure is well known and may also be used in a controllable strut 300, 350 according to the invention. For example, such technology is used widely in the tire industry, as disclosed in U.S. Pat. No. 6,612,165. If a pressure measurement sensor is used in a controllable strut according to the invention, it may transmit its data wirelessly, or it may transmit its data through wires routed through the piston.

Embodiments of the invention using controllable struts 300, 350 may use one controllable strut 300, 350 or two. In embodiments with one controllable strut 300, 350 is used, the other strut may be a conventional strut 30 of the type described above. Alternatively, an embodiment of the invention may use one controllable strut 300, 350 and no conventional strut 30, in which case the controllable strut 300, 350 would have enough force generating capability to raise the liftgate 18 without a second strut 30. In addition to the embodiments of controllable struts 300, 350 described here, several embodiments of controllable struts are described in U.S. Provisional Application No. 60/419,286, as well as in the corresponding commonly assigned non-provisional application, titled "LOCKING STRUT," which was filed on Oct. 17, 2003, and is also incorporated by reference in its entirety.

In embodiments using a controllable strut 300, 350, the opening sequence of the liftgate 18 is similar to the opening sequence of a liftgate 18 moving under the force bias of two standard struts 30. Specifically, the rotating arm 40 is moved to give the struts 30, 300, 350 mechanical advantage, and the two struts 30, 300, 350 are allowed to expand under their own force bias. In environmental conditions that disfavor opening, such as low temperature or large inclination, the controllable strut 300, 350 may be locked at a particular length and used to help maintain a desired opening speed as the conventional strut 30 expands. To some extent, the controllable strut 300, 350 may be used in the locked state as a partially rigid link to push the liftgate open; however, this is limited by the power of the motor 44 and by the resiliency of the controllable strut 300, 350 in the locked state.

However, the closing sequence of such embodiments does differ somewhat from that of the embodiments presented above. Such a closing sequence may be conceptually divided into four phases for purposes of explanation. In the first phase of the closing sequence, the rotating arms 40 move to an appropriate closing position. In the second phase of the closing sequence, midway through its retraction/travel, the controllable strut 300, 350 is locked, and its continued, partially-extended motion is used to force the conventional strut 30 to retract. During this second phase, the rotating arms 40 connected to the two struts 30, 300, 350 may move at different rates and in different directions so as to minimize the time necessary to cause both struts to retract. In the third phase of the closing sequence, the controllable strut 300, 350 is alternately locked and unlocked according to a specified duty cycle in order to control the rate of closure of the liftgate 18. The fourth and final phase of the closing sequence takes place as the liftgate 18 has closed and the rotating arms 40 return to their "home" position. Each of these sequences will be described in more detail below.

Figure 21:
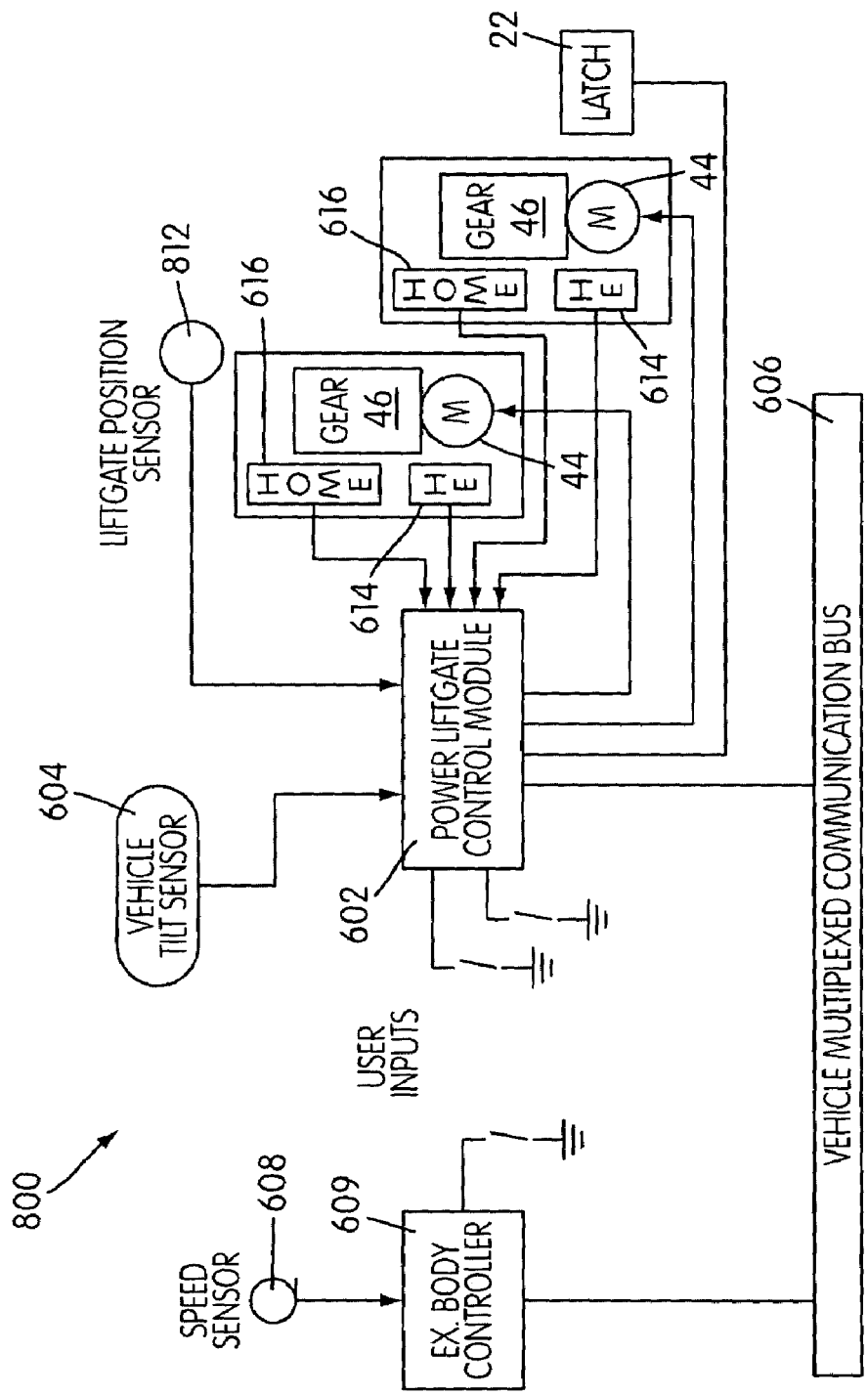
FIG. 21 is a high-level schematic diagram of a control system for a power-operated system in accordance with an embodiment of the invention that includes a controllable strut.

FIG. 21 schematically illustrates the components of a control system 800, which is suitable for use with a two-motor power operated system driving one controllable strut 300, 350 and one conventional strut 30. Control system 800 is substantially similar to control system 600 shown in FIG. 12; for that reason, components common to the two systems 600, 800 will not be discussed further here. However, control system 800 and its algorithms are simpler than those of control system 600 in some respects.

For example, because of the ability to control the rate of ascent and descent of the liftgate 18 conferred by the controllable strut 300, 350, it is not absolutely necessary to have an independent measure of the vehicle tilt, or to calculate the "collapse point" of the struts per se. For this reason, the vehicle tilt sensor 604 is an optional component of the control system 800 and may be omitted, or, alternatively, used to determine only if the automobile 10 is too inclined to safely open the liftgate 18.

In control system 800, the liftgate position sensor 812 is preferably an accelerometer mounted on the liftgate 18. For example, the accelerometer 812 may be mounted on the window of the liftgate 18, a highly damped area that may prevent the accelerometer 812 from reading excessive amounts of noise. Suitable accelerometers that may be used as the liftgate position sensor 812 include the BHZ 02 and BSZ 02 accelerometers manufactured by Temic Telefunken Microelectronic GmbH (Kirchheim, Germany). As those of ordinary skill in the art will realize, the output from an accelerometer may be integrated with respect to time to provide velocity or position measurements. Of course, other types of sensors may be used, including position sensors placed directly at the hinge 20 of the liftgate 18.

In embodiments of the invention using control system 800 and one or more controllable struts 300, 350, as well as in the other embodiments of the invention, obstacle detection may be accomplished in several ways using several different types of sensors. One preferred way to detect obstacles is to monitor the electric current drawn by each motor 44. A spike in the amount of current drawn by the motors 44 indicates that an obstruction is present.

The ability to detect obstacles well by measuring motor current draw is one advantage of embodiments of the present invention. Because the motors 44 draw relatively little current, the control system 800 is able to resolve very small changes in the amount of current drawn by each motor 44. That is not the case when using a conventional large motor to open a liftgate using a "brute force" approach; the large amount of current drawn by a typical motor makes it difficult to resolve the small changes in motor current that indicate the presence of obstructions.

In addition to motor current, obstacle detection may be accomplished by monitoring the output of the accelerometer or other liftgate position sensor 812. Unexpected velocity and acceleration changes can be taken to mean than an obstruction has been encountered.

Finally, obstruction detection may be accomplished by conventional "pinch bars" placed around the opening 16 and connected to the control system 800. However, such "pinch bars" may be unnecessary, and may be added to the automobile 10 only to satisfy particular manufacturer requirements. Embodiments of the invention typically cause the liftgate 18 to impart very low "pinch forces" because the liftgate 18 is not connected to the motors by a rigid link; instead, the resiliency of the struts 30, 300, 350 reduces the pinch forces.

Figure 22:
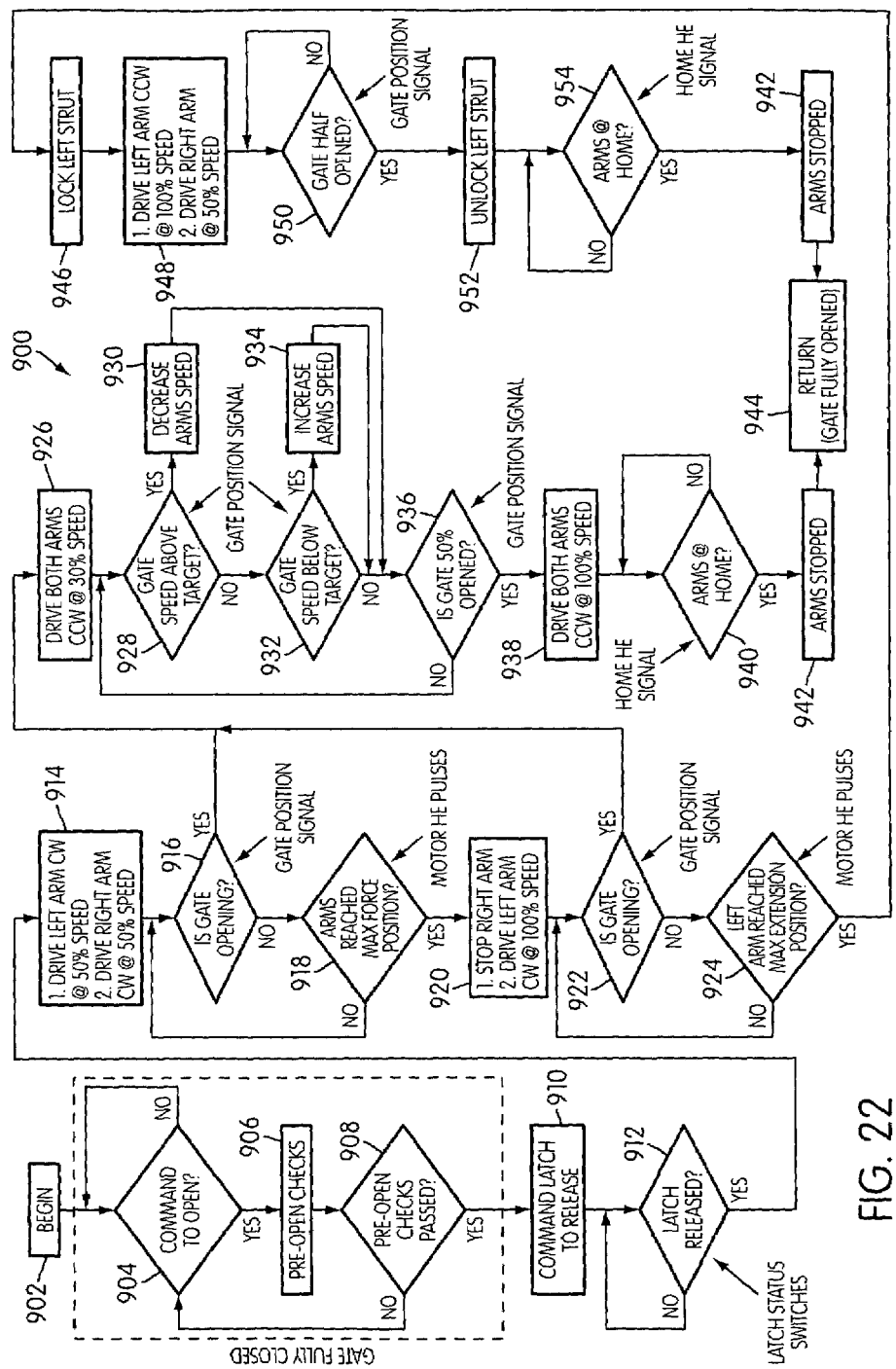
FIG. 22 is a high-level schematic flow diagram of method for opening a liftgate using the control system of FIG. 21.

FIG. 22 is a high-level schematic flow diagram of a method 900 for opening a liftgate 18 according to the present invention. In the following description, the terms "left" and "right" are used for convenience to describe the respective articulating arms 40. Method 900 anticipates the use of one controllable strut 300, 350 and one ordinary strut 30. In the following description, it is assumed that the controllable strut 300, 350 is attached to the left articulating arm 40. However, the controllable strut 300, 350 may be attached to either of the articulating arms 40 without affecting the method 900.

Method 900 begins at block 902, and control passes to block 904. As method 900 begins, it is assumed that the liftgate 18 is in the closed position and that the latch assembly 22 is engaged. At block 904, the control system 800 determines whether the command to open the liftgate 18 has been issued. (The command to open the liftgate 18 may be issued from a control panel within the vehicle or from a key fob attached to a user's key chain, for example.) If the command to open the liftgate 18 has been issued (block 904: YES), control passes to block 906. If the command to open the liftgate has not been issued (block 904: NO), control returns to block 904.

In block 906, pre-opening system checks are performed. The pre-opening system checks performed in block 906 may be identical to those described above with respect to method 700 of the previous embodiment. However, in some variations on method 900 that will be described below, it may not be necessary to move the articulating arms 40 to "home" position. Once the pre-opening system checks have been performed, control passes to block 908, a decision block.

In block 908, if any of the pre-opening system checks have failed (block 908: NO), control returns to block 904 and the liftgate 18 remains closed. Otherwise (block 908: YES), control passes to block 910.

In block 910, the control module 802 mends the latch assembly 22 to release. Control passes to block 912, a decision block. In block 912, the controller 802 communicates with the latch status switches embedded in the latch assembly 22 through the vehicle communication bus 602. If the latch assembly 22 has not released (block 912: NO), control remains in block 912 and the controller 802 repeats the query. Otherwise (block 912: YES), control passes to block 914.

In block 914, the motion of the articulating arms 40 begins. In contrast with method 700, method 900 makes use of variable actuation speeds of the articulating arms 40 as well as coordinated but opposite direction movement of the two articulating arms 40. The use of variable speeds and movements of the articulating arms 40 in opposite directions during part of the actuation cycle maximizes the advantages of the controllable strut 300, 350. In block 914, movement of the articulating arms 40 begins when the controller 802 causes both motors 44 to move the articulating arms 40 clockwise at 50% of maximum speed. Once movement of the articulating arms 40 has begun, control passes to block 916, a decision block.

In block 916, the control module 802 takes input from the liftgate position sensor 812 to determine whether the liftgate 18 is opening. If the liftgate 18 is opening (block 916: YES), control of method 900 passes to block 926. If the liftgate 18 is not opening (block 916: NO), control passes to block 918.

When control of method 900 reaches block 918, it is assumed that there is some problem in opening the liftgate 18. The control module 802 considers the input from the motor Hall Effect sensors 614 to determine whether the articulating arms 40 have reached a position in which they exert maximum force. If the articulating arms have not reached a position of maximum force (block 918: NO), control of method 900 returns to block 916. If the control module determines in block 918 that the articulating arms 40 have reached a position of maximum force (block 918: YES), control of method 900 passes to block 920. (The position of maximum force is geometry dependent and can be calculated by one of skill in the art based on the geometry of the particular vehicle 10.)

In block 920, the control module 802 stops the right articulating arm 40 and increases the clockwise speed of the left articulating arm 40 (connected to the controllable strut 300, 350) to 100%. Control of method 900 passes to block 922, a decision block.

In block 922, the control module 802 again decides whether or not the liftgate 18 is opening. If the liftgate 18 is opening (block 922: YES) control of method 900 passes to block 926. Otherwise (block 922: NO), control passes to block 924.

In block 924, the control module 802 takes input from the Hall Effect sensors 614 in the motors 44 to determine by the position of the articulating arms 40 whether the controllable strut 300, 350 has reached a position in which it should be fully extended. If the articulating arms 40 have reached a position in which the controllable strut 300, 350 should be fully extended (block 924: YES), control of method 900 passes to block 946. Otherwise (block 924: NO), control of method 900 returns to block 922.

In block 946, the controllable strut 300, 350 is locked, e.g., by closing the valve 308, 323 within the controllable strut 300, 350. Control of method 900 then passes to block 948.

In block 948, the fully extended and locked controllable strut 300, 350 is used to assist the extension of the other strut 30. To do this, the left articulating arm 40 attached to the controllable strut 300, 350 is driven counter clockwise at 100% of its speed while the articulating arm 40 connected to the regular strut 30 is driven at 50% of its maximum speed. Control passes to block 950, a decision block.

In block 950, the control module 802 takes input from the liftgate position sensor 812 to determine whether the liftgate

18 is half open. If the liftgate 18 is half open (block 950: YES), control of method 900 passes to block 952. If the liftgate 18 is not half open (block 950: NO), control of method 900 remains at block 950 and the control module 802 repeats the query.

In block 952, the controllable strut 300, 350 is unlocked, e.g., by opening the valve 308, 323. The articulating arms 40 continue to rotate. Control of method 900 passes to block 954.

In block 954, the control module takes input from the home position sensor 616 to determine whether the articulating arms 40 have reached the home position. If the articulating arms 40 have reached the home position (block 954: YES), both articulating arms 40 are stopped as indicated in block 942. Otherwise (block 954: NO), control of method 900 remains at block 954 and the control module 802 repeats the query. Once the articulating arms 40 are stopped at block 942, control of method 900 passes to block 944, where method 900 terminates and returns.

Blocks 946–954 illustrate the tasks performed by the control module 802 if movement of the liftgate 18 is not detected after movement of the articulating arms 40 has been initiated. However, as was described earlier, if movement of the liftgate 18 is detected either at block 916 or at block 922, control of method 900 passes directly to block 926.

Before block 926 receives control of method 900, the articulating arms 40 have been moving clockwise (i.e., with respect to the coordinate system of FIG. 4). The clockwise movement of the articulating arms 40 covers only a small sector of the total 360° possible travel of the articulating arms 40, and is enough to place the controllable strut 300, 350 and the regular strut 30 in a position of mechanical advantage sufficient to begin opening the liftgate 18. In block 926, the clockwise movement of the articulating arms 40 is stopped and reversed, such that the articulating arms 40 begin moving counter clockwise with respect to the coordinate system of FIG. 4. Initially, both articulating arms are moved counter clockwise at 30% of maximum speed. Control of method 900 passes to block 928, a decision block.

In block 928, the control module 802 takes input from the liftgate position sensor 812 to determine whether the liftgate 18 is opening at a speed greater than a desired target speed. If the liftgate is opening at a greater speed than desired (block 928: YES), control passes to block 930, in which the speed of the articulating arms 40 is decreased by some fraction, e.g., 5%. If the speed of the liftgate 18 is not above the desired target speed (block 928: NO), control of method 900 passes to block 932, a decision block. In block 932, the control module 802 takes input from the liftgate position sensor 812 to determine whether the liftgate speed is below a desired target speed. If the speed of the liftgate 18 is below a desired target speed (block 932: YES), control of method 900 passes to block 934, in which the control module 802 increases the speed of the articulating arms 40. Otherwise (block 932: NO), control passes to block 936, another decision block.

In block 936, the control module 802 takes input from the liftgate position sensor 812 to determine whether the liftgate 18 is 50% open. If the liftgate 18 is 50% open (block 936: YES), control of method 900 passes to block 938, in which the control module 802 continues to drive both articulating arms 40 counter clockwise toward the home position at 100% speed. If the gate is not 50% open (block 936: NO), control of method 900 returns to block 928, the two articulating arms 40 continue to move counter clockwise at 30% speed, and the speed control decision blocks 928 and 932 are repeated.

In block 940, the control module 802 takes input from the home position sensor 616 to determine whether the articulating arms 40 have reached the home position. If the articulating arms 40 have reached the home position (block 940: YES), control of method 900 passes to block 942, in which the articulating arms 40 are stopped, before passing to block 944, in which method 900 terminates and returns. If the articulating arms 40 have not reached the home position (block 940: NO), the articulating arms 40 continue to rotate counter clockwise toward the home position at 100% speed.

Although not explicitly shown in FIG. 22 so as not to complicate the description of method 900, the valves 308, 323 within the controllable strut 300, 350 may be used in either continuous or cycling operation to maintain the desired movement speed of the liftgate 18, in addition to controlling the speed of the articulating arms 40. Blocking the controllable strut 300, 350 can be particularly useful if the liftgate 18 is moving too fast and it becomes necessary to slow its ascent.

Figure 23:
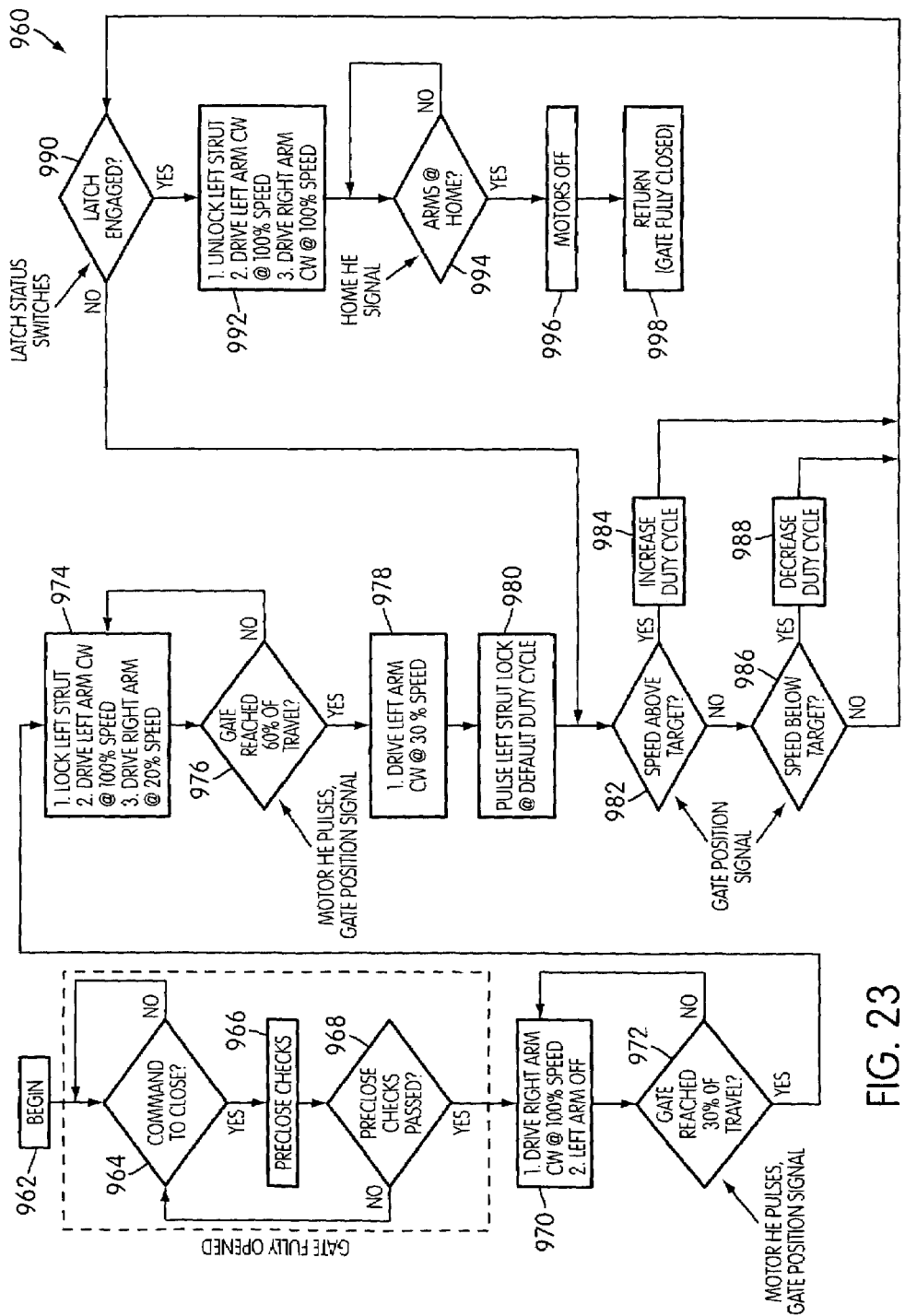
FIG. 23 high-level schematic flow diagram of method for closing a liftgate using the control system of FIG. 21.

FIG. 23 is a high-level schematic flow diagram of a method 960 for closing the liftgate 18 using an embodiment with one controllable strut 300, 350 and one regular strut 30. In the following description of method 960, the same coordinate system is used as in the description of method 900, i.e., the coordinate system as shown in FIG. 4. Method 960 begins at block 962, and control passes to block 964, a decision block.

In block 964, the control module 802 determines whether the command to close the liftgate 18 has been received. If the command to close the liftgate has been received (block 964: YES), control of method 960 passes to block 966. Otherwise (block 964: NO), control of method 900 remains at block 964 and the control module 802 repeats the query.

In block 966, the control module performs a number of pre-closing checks. The type of pre-closing checks performed in block 966 may be the same as the pre-closing checks that were described above with respect to method 750. Once the pre-closing checks have been completed in block 966, control of method 960 passes to block 968, a decision block.

In block 968, the control module 802 determines whether the pre-closing checks were passed. If the pre-closing checks were passed (block 968: YES), control of method 960 passes to block 970. If the pre-closing checks were not passed (block 968: NO), control of method 960 returns to block 964.

In block 970, the movement of the articulating arms 40 begins as the right articulating arm 40, the articulating arm 40 connected to the regular strut 30, is driven clockwise at 100% of its maximum speed. During this movement, the left articulating arm 40, the articulating arm connected to the controllable strut 300, 350, remains still. Control of method 960 passes to block 972, a decision block.

In block 972, the control module 802 takes input from the liftgate position sensor 812 and the motor Hall Effect sensors 614 to determine whether the liftgate 18 is 30% closed. If the liftgate 18 is 30% closed (block 972: YES), control of method 960 passes to block 974. If the liftgate 972 is not yet 30% closed (block 972: NO), control of method 960 returns to block 970 and the movement of the right articulating arm 40 continues.

By the time block 974 has been reached, the right articulating arm 40, connected to the regular strut 30, has been moving clockwise for some time while the left articulating arm 40, connected to the controllable strut 300, 350, has been stopped. In block 974, the valve 308, 323 in the controllable strut 300, 350 is engaged, thereby locking the controllable strut 300, 350. This allows the controllable strut 300, 350 to be used to force the regular strut 30 to retract. Once the controllable strut 300, 350 is locked, the left articulating arm 40, connected to the controllable strut 300, 350, is driven clockwise at 100% of its maximum speed. At the same time, the right articulating arm 40, connected to the regular strut 30, slows down and begins moving at 20% of its maximum speed. Control of method 960 passes to block 976, a decision block.

In block 976, the control module 802 takes input from the motor Hall Effect sensors 614 and the liftgate position sensor 812 to determine whether the liftgate is 60% closed. If the liftgate 18 is 60% closed (block 976: YES), control of method 960 passes to block 978. If the liftgate 18 is not 60% closed (block 976: NO), control of the method 960 remains at block 974 and the movement of the two articulating arms 40 continues.

In block 978, the control module 802 reduces the speed of the left articulating arm 40, connected to the controllable strut 300, 350, to 30% of its maximum speed. Control passes to block 980, in which the control module 802 sends pulses to the driver 310 within the controllable strut 300, 350, causing the valves 308, 323 within the controllable strut 300, 350 to cyclically open and close at a predefined standard duty cycle. Control of method 960 then passes to block 982, a decision block.

In block 982, the control module 802 takes input from the liftgate position sensor 812 to determine whether the speed of the liftgate 18 is above the desired target speed. If the speed of the liftgate 18 is above the desired target speed (block 982: YES), control of method 960 passes to block 984, in which the duty cycle of the controllable strut 300, 350 is increased, such that the controllable strut 300, 350 is in the locked condition a greater percentage of the time. If the speed of the liftgate 18 is not above the desired target speed (block 982: NO), control of method 960 passes to block 986, another decision block.

In block 986, the control module 802 takes input from the liftgate position sensor 812 to determine whether the speed of the liftgate 18 is below the desired target speed. If the speed of the liftgate 18 is below the desired target speed, control of method 960 passes to block 988, in which the duty cycle of the controllable strut 300, 350 is decreased, such that the controllable strut 300, 350 is in the locked state a lesser percentage of the time. After blocks 984 and 988, and if the speed of the liftgate 18 is not below the desired target speed (block 986: NO), control of method 960 passes to block 990, another decision block.

At block 990, the control module 802 takes input from the sensors within the latch assembly 22 to determine whether the latch assembly 22 has engaged. The latch assembly 22 has engaged (block 990: YES), control of method 960 passes to block 992. If the latch assembly 22 has not engaged (block 990: NO), control of method 960 returns to block 982, and the speed control algorithm is repeated.

In block 992, once the latch assembly 22 has engaged, the controllable strut 300, 350 is unlocked. Once the controllable strut 300, 350 is unlocked, both struts are driven clockwise at 100% of their maximum speed toward the home position. Control of method 960 passes to block 994, a decision block.

In block 994, the control module 802 takes input from the home position sensors 616 to determine whether the articulating arms 40 have reached the home position. If the articulating arms 40 have reached the home position (block 994: YES), control of method 960 passes to block 996, in which the motors 44 are shut off, before method 960 terminates and returns at block 998. If the rotating arms 40 have not reached the home position (block 994: NO), control of method 960 remains at block 994, and the control module 802 repeats the query.

In the methods 900, 960 described above, the relative speeds set forth depend on a number of factors, including the desired speed at which the liftgate 18 is to open. The speeds will depend on a number of factors, including the geometry of the vehicle 10, the weight of the liftgate 18, and the power of the motors 44.

The last tasks of methods 900 and 960 are to move the articulating arms 40 back into the home position. However, moving the articulating arms 40 back into the home position after each and every movement of the liftgate 18 is time consuming and increases the amount of time a user must wait, for example, after closing the liftgate 18 before it can be opened again. (Also known as the "cycle time.") That delay can be undesirable.

Typically, when the gate is initially fully closed, the articulating arms 40 are about 180° away from the home position. In certain embodiments, the articulating arms 40 may simply be left in that position when the gate is closed, thereby eliminating the cycle time delay created by moving the articulating arms back to the home position.

In that 180°-from-home position, the struts 30, 300, 350 may not be in a position such that the user will be able to open the liftgate 18 manually. (As was described above, in the normal operation of the liftgate 18, the home position is the position in which traditional struts 30 would be mounted if they were not attached to articulating arms 40 and motors 44. This allows completely manual opening of the liftgate 18.) Despite the fact that completely manual opening of the liftgate 18 may not be possible if the articulating arms 40 are left 180° from the home position, control system 800 could be provided with a program whereby an attempt by the user to open the liftgate 18 manually would be detected, and the articulating arms 40 would be caused to move in whatever direction was necessary to assist the user in the manual movement of the door.

Although the invention has been described with respect to several embodiments, the embodiments described are meant to be exemplary and not limiting. Modifications and variation to the invention will occur to those of ordinary skill in the art, and may be made within the scope of the appended claims.

What is claimed is:

1. A powered closure drive mechanism for a vehicle, comprising:

a controllable strut mountable between a frame of a vehicle and a closure pivotally connected to the frame, said strut having opposite ends moveable in opposite directions toward and away from one another, said strut having a lock which, when in a locking condition, substantially prevents movement of the opposite ends of said strut relative to one another, and, when said lock is in a releasing condition, allows movement of the opposite ends of said strut relative to one another, the opposite ends of said strut being biased when said lock is in the releasing condition to move away from one another, an angular orientation of said strut being adjustable between orientations in which the bias of the strut overcomes a weight of the closure so as to move the closure in an opening direction, and orientations in which the weight of the closure overcomes the bias of the strut so as to move the closure in a closing direction;

a motor assembly operatively coupled with said strut so as to adjust the angular orientation of the strut by moving one of said opposite ends and, thereby, to effect opening and closing movement of the closure;

a dynamic property detector that detects one or more dynamic properties of the closure; and a controller operatively coupled to said motor, said lock, and said dynamic property detector, said controller controlling said motor and said lock based, at least in part, upon said one or more dynamic properties detected by said dynamic property detector.

2. The powered closure drive mechanism of claim 1, wherein said strut includes restricted orifice structure constructed and arranged to allow restricted flow of strut working fluid across a piston of said strut as said piston moves within said strut.

3. The powered closure drive mechanism of claim 2, wherein the lock of said strut comprises:

a driver within said strut; and a valve structure within said strut driven by said driver to move between one or more blocking positions in which said strut working fluid is prevented from moving through said restricted orifice structure and one or more non-blocking positions in which said strut working fluid may flow through said restricted orifice structure;

wherein said valve structure is in one of said one or more blocking positions when said lock is in a locking condition.

4. The powered closure drive mechanism of claim 1, wherein a first end of the strut is pivotally connected to the closure and a second end of the strut is connected to said motor via an arm, said motor being fixed relative to said frame.

5. The powered closure drive mechanism of claim 4, further comprising another strut, said other strut being movably mounted between said closure and said frame and having opposite ends moveable toward and away from one another.

6. The powered closure drive mechanism of claim 5, wherein a first end of said other strut is pivotally connected to the closure and a second end of the strut is connected to a second motor via a second arm, said second motor being fixed relative to said frame and being controlled by said controller.

7. The powered closure drive mechanism of claim 1, wherein said dynamic property detector is an accelerometer.

8. The powered closure drive mechanism of claim 7, wherein said accelerometer is mounted on a window provided in said closure.

9. The powered closure drive mechanism of claim 1, wherein said one or more dynamic properties comprise one or more dynamic properties selected from the group consisting of position, inclination, velocity, acceleration, and jerk.

10. A method of actuating a pivotally-mounted closure supported by a controllable strut having an integral lock, comprising:

moving the controllable strut among angular orientations of the controllable strut relative to the closure and the closure frame to move the strut between opening angular orientations in which the force bias provided by the controllable strut overcomes the weight bias of the closure, causing the closure to move toward an open position, and closing angular orientations in which the force bias provided by the controllable strut is overcome by the weight bias of the closure, causing the closure to move toward a closed position;

monitoring one or more dynamic properties of the closure while the closure moves toward the open and closed positions; and based upon the monitored dynamic properties of the closure, selectively activating and deactivating the lock of the controllable strut to maintain the controllable strut at least temporarily at particular lengths.

11. The method of claim 10, wherein said lock comprises:

a driver mounted within the controllable strut; and a valve structure within the controllable strut driven by the driver to move between one or more blocking positions in which a strut working fluid within the controllable strut is prevented from moving through a restricted orifice structure within the strut and one or more non-blocking positions in which the strut working fluid may flow through the restricted orifice structure.

12. The method of claim 10, further comprising moving a second strut among angular orientations of the second strut relative to the closure and the closure frame to move the second strut between opening angular orientations in which the force bias provided by the second strut in combination with the force bias provided by the controllable strut overcomes the weight bias of the closure, causing the closure to move toward an open position, and closing angular orientations in which the force bias provided by the second strut in combination with the force bias provided by the controllable strut is overcome by the weight bias of the closure, causing the closure to move toward a closed position.

13. The method of claim 12, wherein moving the controllable strut and moving the second strut comprise activating one or more motors coupled to ends of the controllable strut and the second strut, respectively.

14. The method of claim 13, wherein moving the controllable strut and moving the second strut comprise causing coordinated powered movements of the ends of the controllable strut and the second strut in opposite directions for at least a portion of the powered movements.

15. The method of claim 13, wherein moving the controllable strut and moving the second strut comprise causing coordinated powered movements of the ends of the controllable strut and the second strut at different velocities for at least a portion of the powered movements.

16. The method of claim 13, further comprising monitoring one or more motor properties to determine whether an obstruction is present.

17. The method of claim 10, wherein the one or more dynamic properties are one or more properties selected from the group consisting of closure position, closure velocity, closure acceleration, and closure jerk.

18. A rear assembly for a vehicle, comprising:

a rear assembly frame defining an opening;

a closure constructed and arranged to engage and close said opening, said closure being mounted on a generally horizontally-extending hinge for pivotal movement between open and closed positions;

a motor mounted to the rear assembly frame;

a controllable strut having opposite ends moveable in opposite directions toward and away from one another, and having a lock including a driver within said controllable strut, and a valve structure within said controllable strut driven by said driver to move between one or more blocking positions in which a strut working fluid within said controllable strut is prevented from moving through a restricted orifice structure within the strut and one or more non-blocking positions in which said strut working fluid may flow through said restricted orifice structure;

wherein said lock substantially prevents movement of the opposite ends of said strut relative to one another when said lock is in a locking condition and allows movement of the opposite ends of said strut relative to one another when said lock is in a releasing condition, the opposite ends of said strut being biased when said lock is in the releasing condition to move away from one another;

a connecting member pivotally connected to said motor and a first end of said controllable strut, said connecting member being constructed and arranged to move the first end of said controllable strut between opening angular orientations in which the bias of the controllable strut overcomes a weight of the closure so as to move the closure in an opening direction, and closing angular orientations in which the weight of the closure overcomes the bias of the strut so as to move the closure in a closing direction;

a dynamic property detector that detects one or more dynamic properties of the closure; and a controller operatively connected to said motor, said lock, and said dynamic property detector, said controller controlling said motor and said lock based, at least in part, upon the one or more dynamic properties detected by said dynamic property detector.

19. The rear assembly of claim 18, wherein the dynamic property detector is an accelerometer mounted on said closure.

* * * * *